United States Patent [19]
Sugiki

[11] Patent Number: 5,990,948
[45] Date of Patent: Nov. 23, 1999

[54] NOISE CANCELLING CIRCUIT FOR PIXEL SIGNALS AND AN IMAGE PICKUP DEVICE USING THE NOISE CANCELLING CIRCUIT

[75] Inventor: Tadashi Sugiki, Yokohama, Japan

[73] Assignee: Kabushiki Kaisha Toshiba, Kawasaki, Japan

[21] Appl. No.: 08/808,419

[22] Filed: Feb. 28, 1997

[30] Foreign Application Priority Data

Feb. 29, 1996 [JP] Japan .................................. 8-042920
Mar. 4, 1996 [JP] Japan .................................. 8-046121

[51] Int. Cl.$^6$ ...................................................... H04N 9/64
[52] U.S. Cl. ............................................ 348/250; 348/311
[58] Field of Search .................................... 348/241, 250, 348/302, 303, 308, 294, 297, 311

[56] References Cited

U.S. PATENT DOCUMENTS 5,461,425 10/1995 Fowler et al. ........................... 348/294
5,717,458 2/1998 Yonemoto ................................ 348/305

Primary Examiner—Wendy Garber
Assistant Examiner—Andrew D. Martin
Attorney, Agent, or Firm—Pillsbury Madison & Sutro LLP

[57] ABSTRACT

The elimination of noise can be positively achieved by a simpler arrangement. For this reason, a capacitor holds a difference between a level at a first time point of an input signal and a reference potential of a given level. A capacitor holds a difference between a level at a second time point of the input signal and a threshold value of an inverter serving as a comparator. The first and second capacitors are switched to a series-connected state. With a combined voltage of holding voltages on the first and second capacitors as an input-side voltage to the inverter, a reference voltage Vref varies as a bias through the input-side voltage. When the output of the inverter is inverted during a portion of a time in which the reference voltage varies, a controller enables the holding of a measurement value corresponding to the reference voltage, the measurement value being used as a variation corresponding to the input signal.

20 Claims, 18 Drawing Sheets

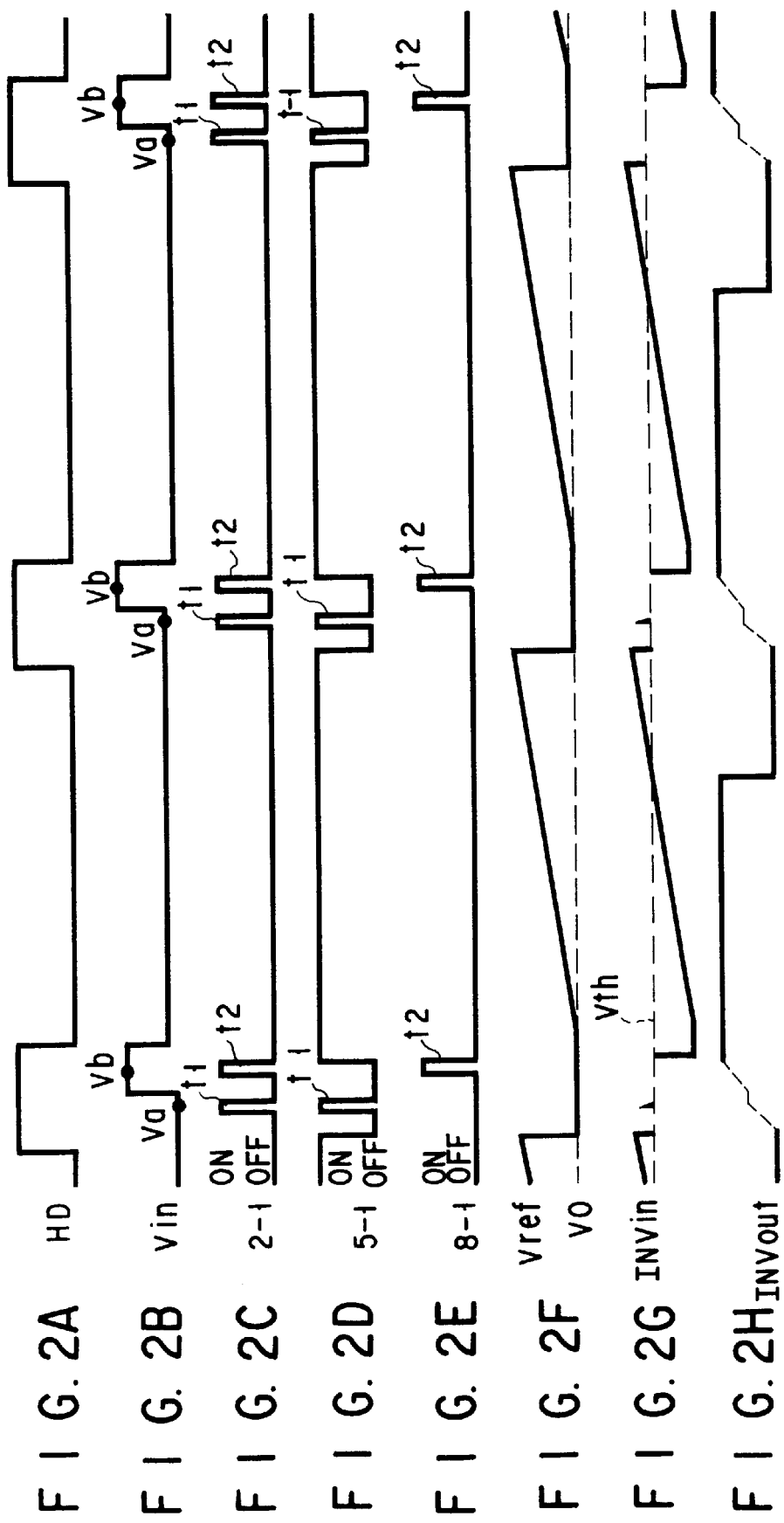

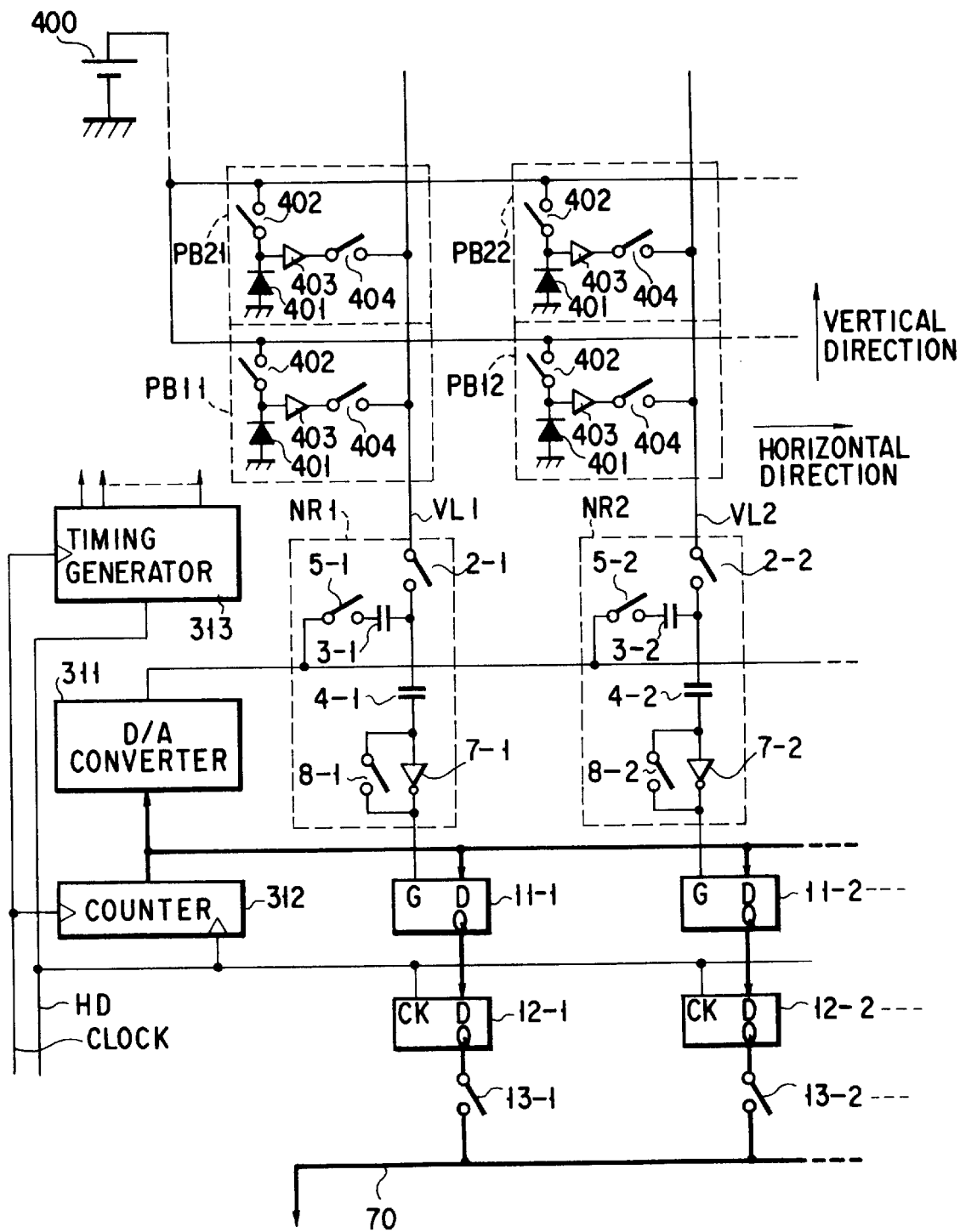
F I G. 3

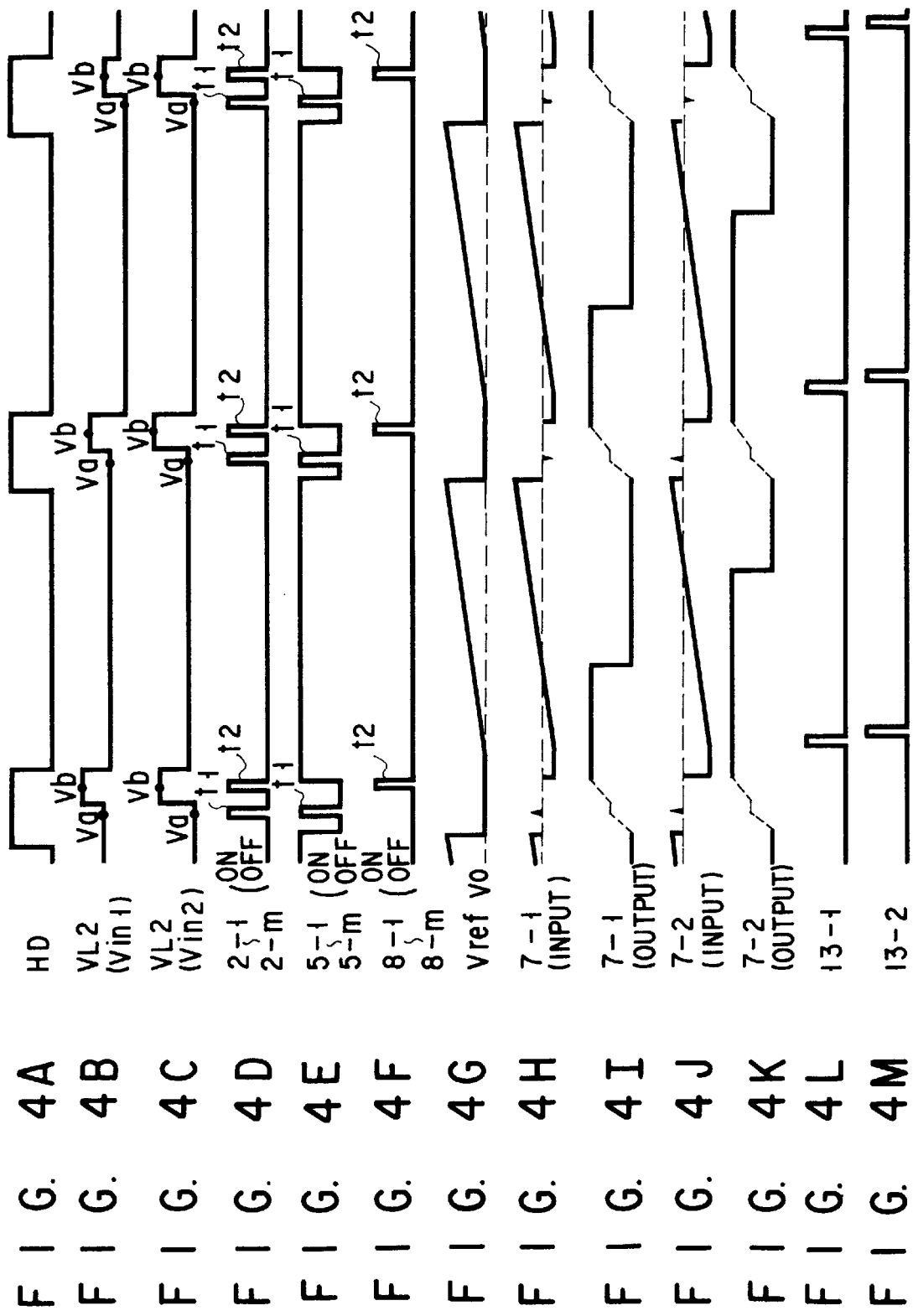

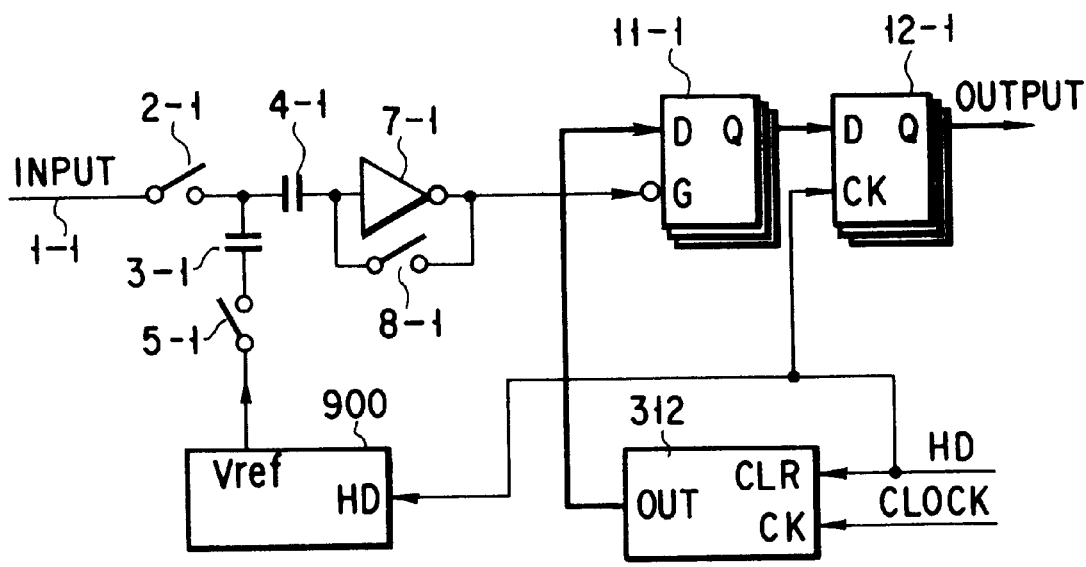
F I G. 6A
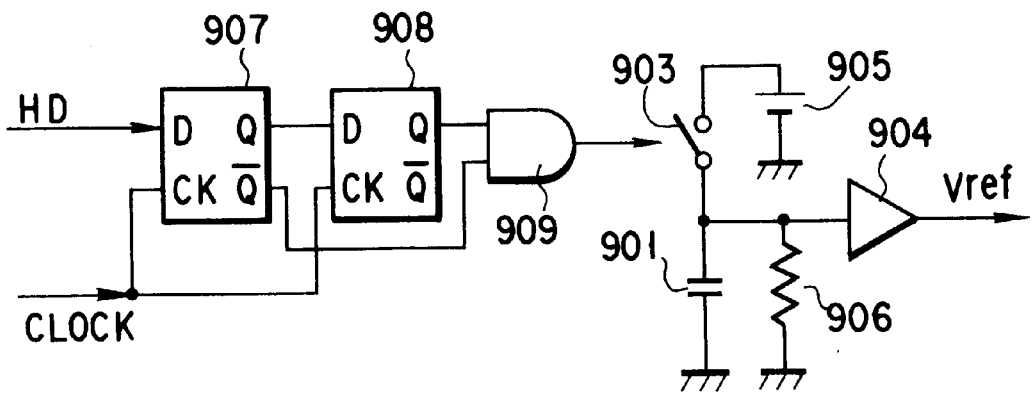
F I G. 6B

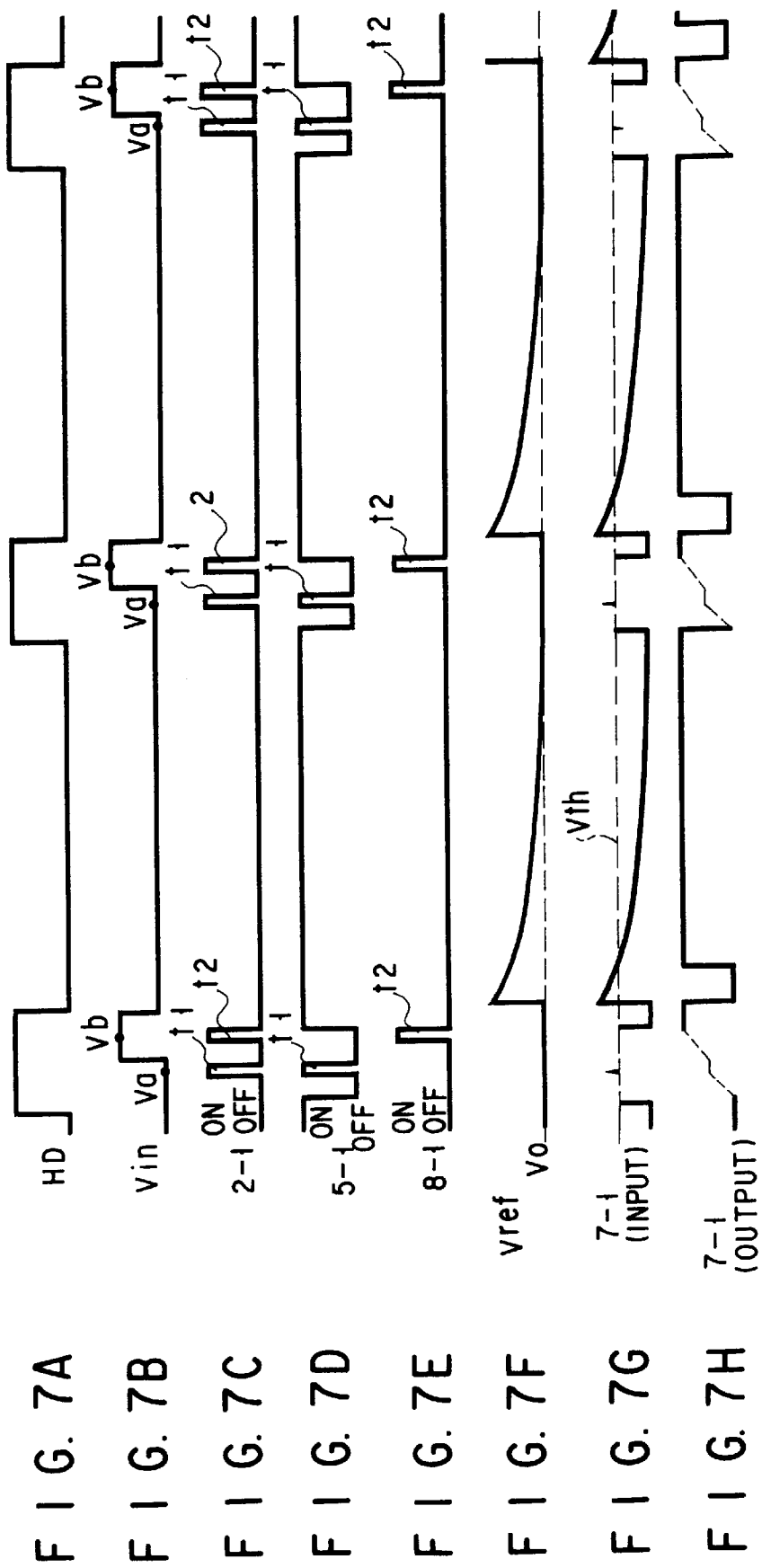

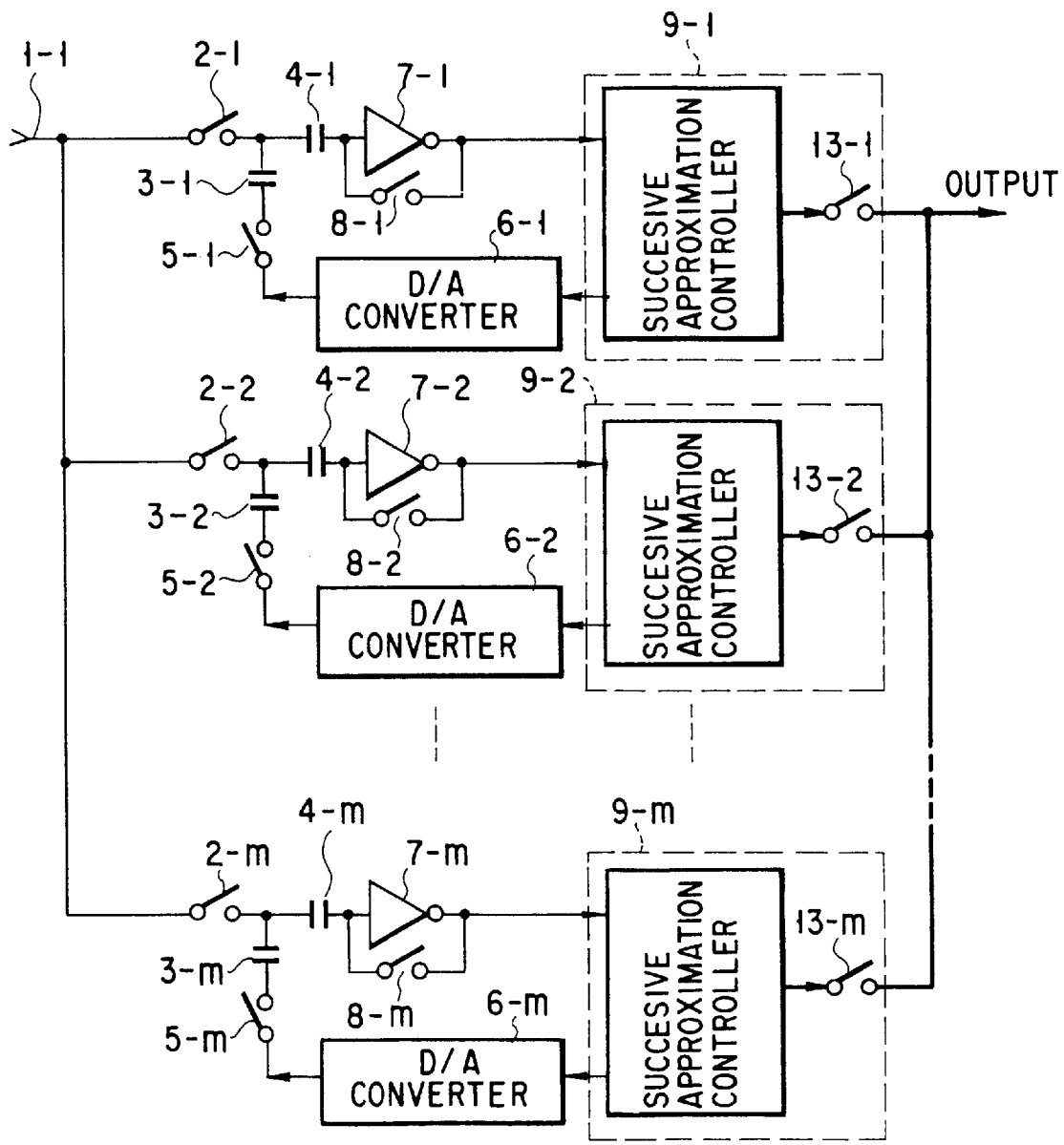
F I G. 8

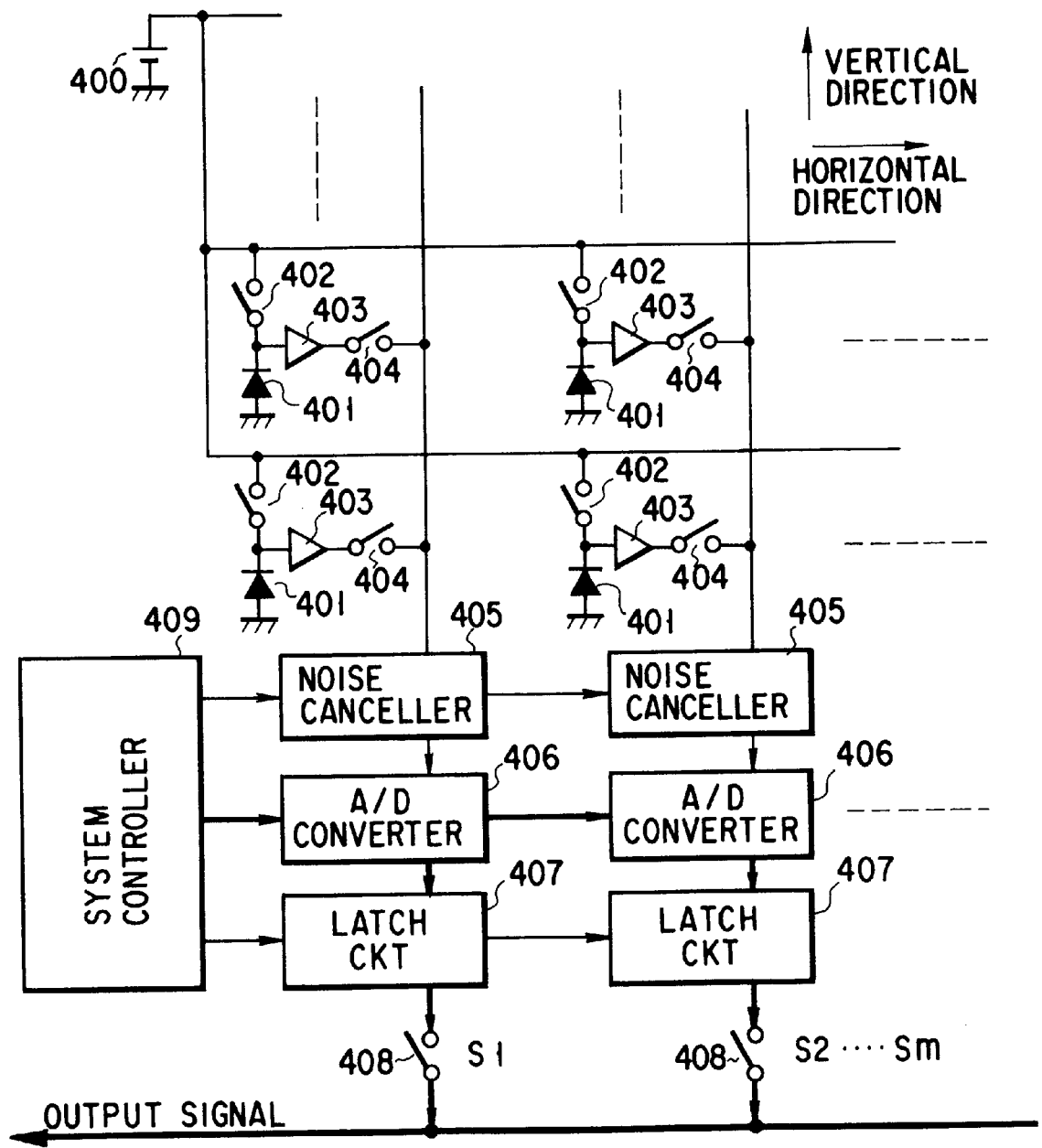
F I G. 10

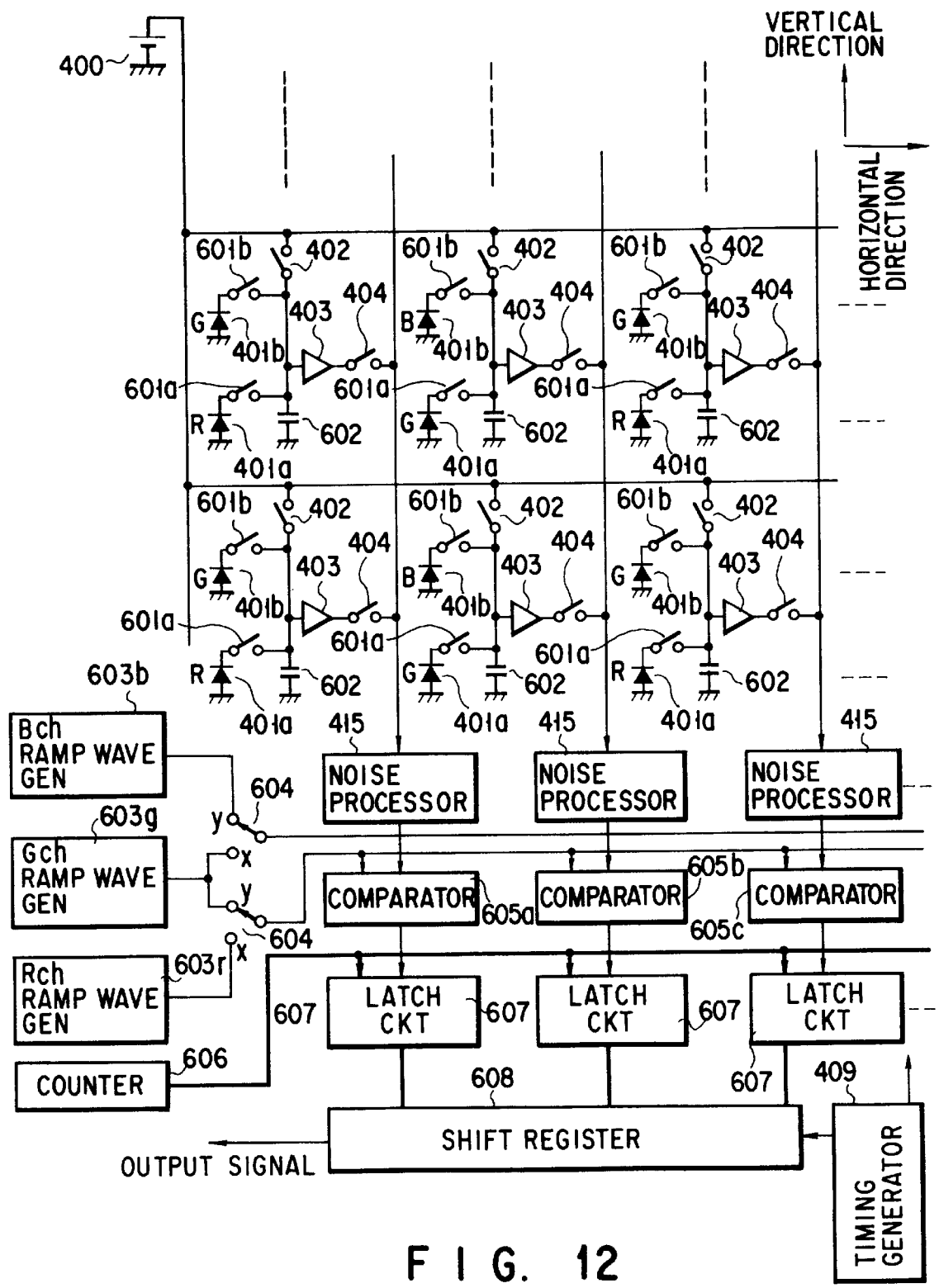
F I G. 12

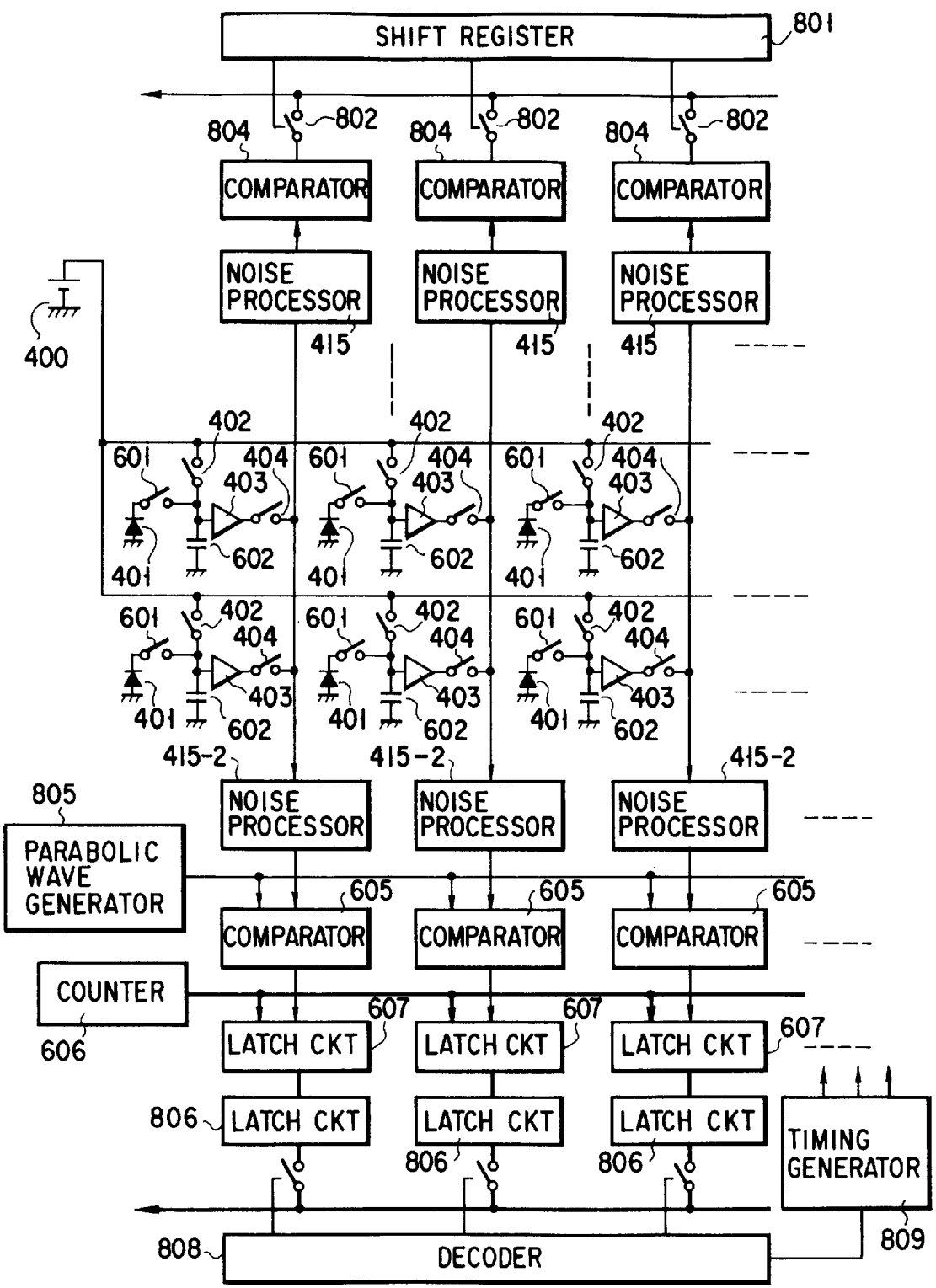
F I G. 14

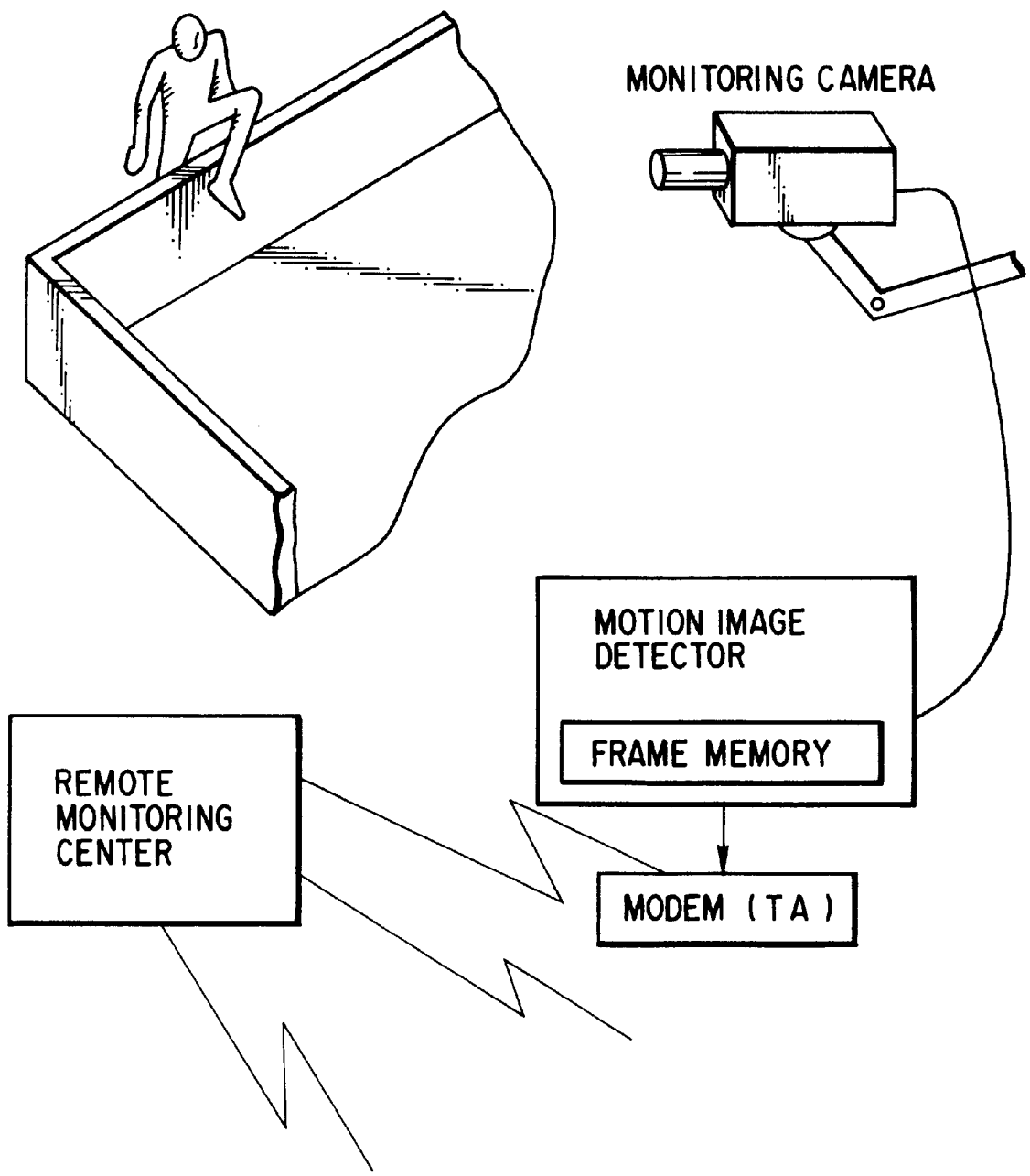
F I G. 16

NOISE CANCELLING CIRCUIT FOR PIXEL SIGNALS AND AN IMAGE PICKUP DEVICE USING THE NOISE CANCELLING CIRCUIT

BACKGROUND OF THE INVENTION

The present invention relates to a noise reducing circuit for pixel signals and an image pickup device using this noise reducing circuit which, in the case where, as in a pixel output signal in a solid-state image pickup device, a signal component is multiplexed on a varying DC component, can cancel the DC component to derive the signal component accurately or can be less affected by an extraneous signal and, by doing so, can achieve a compact unit.

The CCD type solid-state image pickup device using a charge coupled device (CCD) and a CMOS type solid-state image pickup device have been known as a solid-state image pickup device for use in a video camera and electronic still camera.

For the CCD type solid-state image pickup device, a read-out signal is taken out as an amplified form through one amplifier provided in an output stage of a horizontal transfer section. Further, the amplifier can be constructed as a low input capacity on-chip amplifier. It is, therefore, possible to obtain a low-noise, high-quality video signal almost without involving a level variation for each pixel. Since, however, a signal charge sequentially transferred in the solid-state image pickup device is, as viewed as a signal current, very small on the order of 100 nA, it is susceptible to the extraneous noise and is adversely affected in its S/N ratio simply because the solid state image pickup device is located near a timing generator and digital signal processing circuit. It is, also, necessary to have a high mounting technique, as well as a proper arrangement of component parts, in the achievement of a compact camera. This, in addition to the ready susceptibility of the device to the extraneous noise, provides a bar to achieving a small-sized camera.

In the CMOS type solid-state image pickup device, on the other hand, amplifiers for deriving outputs of a respective plurality of photodiodes are incorporated, and a very weak signal current amplified thereby. The output of each amplifier is taken out as an image pickup signal through the scannings of corresponding vertical and horizontal scanning switches.

Since this kind of solid-state image pickup device uses a plurality of amplifiers for each pixel, if there occurs a variation, in a DC component, between the output voltages, then fixed-pattern noise is produced even at a light shutting time at an image pickup section.

BRIEF SUMMARY OF THE INVENTION

It is accordingly the object of the present invention to provide a noise cancelling circuit for pixel signals and image pickup device which, by cancelling a DC component of an output signal for each pixel, can accurately derive a signal component and achieve this in a simpler arrangement.

A noise cancelling means for pixel signals, according to the present invention, comprises a first holding means for holding a difference voltage between an input signal level at a first (or a second) time point and a reference potential to a first capacitor connected between an input terminal and reference voltage source, at the first time point, a second holding means for holding a difference voltage between an input signal level at the second (or the first) time point and a threshold voltage of an inverting circuit to a second capacitor connected between the input terminal and the inverting circuit input terminal, a reference voltage variable means for supplying a reference voltage, as a bias, to the input of the inverting circuit through a series-connection of the first and second capacitors to make the reference voltage variable, and deciding means for deciding an associated digital value as being a pure input signal when an output of the inverting circuit is inverted during a portion of a time in which the reference voltage varies.

According to the above-mentioned means, after the obtainment of sampling voltages on the first and second capacitors, the reference voltage is varied and a digital value corresponding to the reference voltage when the output of the comparator is changed is taken as a variation level of the input signal.

According to the present invention, the input signal is comprised of a signal taken out from the photo sensing elements in the solid-state image pickup device.

Further, according to the present invention, the solid-state image pickup device is characterized in that the outputs of the photo sensing elements are taken out through amplifiers and signal lines.

According to the present invention, the solid-state image pickup device is characterized in that the outputs of the photo sensing elements are taken out through a charge coupled device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A to 2H are a timing chart showing signals of associated parts in the basic arrangement, as well as timing pulses, for explaining the operation of the FIG. 1A circuit arrangement;

FIG. 3 is a view showing a practical form of the present invention;

FIGS. 4A to 4M are a timing chart showing signals of associated parts, as well as timing pulses for explaining the operation of the FIG. 3 circuit;

FIG. 6A is a view showing a basic arrangement according to another embodiment of the present invention;

FIG. 6B is a view showing a practical form of a reference voltage generator in FIG. 6A;

FIGS. 7A to 7H are a timing chart showing signals of associated parts, as well as timing pulses, for explaining the operation of the FIG. 6A circuit;

FIG. 8 is a view showing another embodiment of the present embodiment;

FIG. 10 is an explanatory view showing an image pickup device according to another embodiment of the present invention;

FIG. 12 is an explanative view showing a color image pickup device according to the present invention;

FIG. 14 is an explanatory view showing a motion area detecting function-equipped solid-state image pickup device according to the present invention;

FIG. 16 is an explaining view showing a remote monitoring system;

DETAILED DESCRIPTION OF THE INVENTION (Preferred Embodiments)

The embodiments of the present invention will be explained below with reference to the accompanying drawing.

Figure 1A:
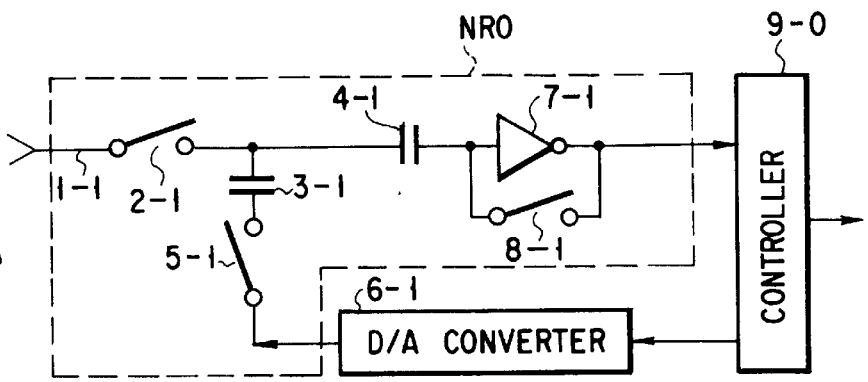
FIGS. 1A to 1D are views showing a basic circuit arrangement according to an embodiment of the present invention.
Figure 1B:
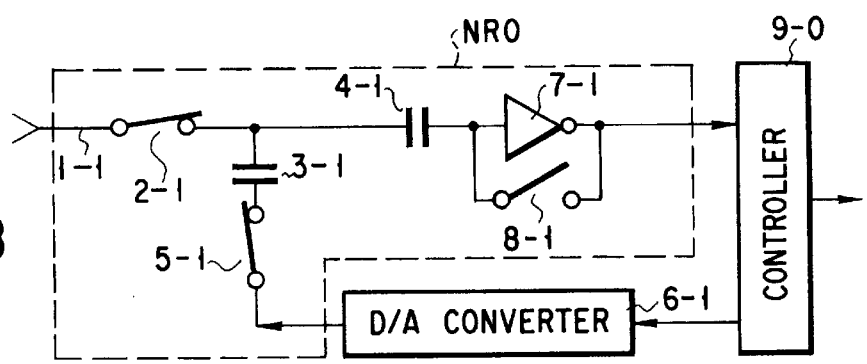

FIG. 1A shows a basic one embodiment of the present invention. A read-out signal (imaging signal) from a corresponding pixel of a solid-state image pickup device is supplied to an input terminal 1-1 of a noise cancelling circuit NR0. The input terminal 1-1 is connected via a switch 2-1 to a connection point between one electrode of a capacitor 3-1 and one electrode of a capacitor 4-1. The other electrode of between the voltage Va of the input signal Vin and the potential level of a reference potential Vo is stored in the capacitor 3-1.

Figure 1C:
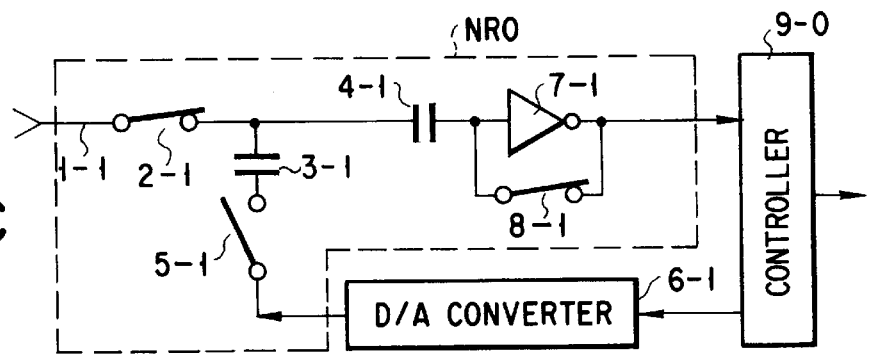

Next, FIG. 1C shows the states of the respective switches at time t2. At time t2, the switches 2-1 and 8-1 are turned ON and the switch 5-1 is turned OFF.

In this state, at time t2, a difference (Vth−Vb) between the voltage Vb of the input signal Vin and a threshold voltage Vth of the inverter 7-1 is stored.

Figure 1D:
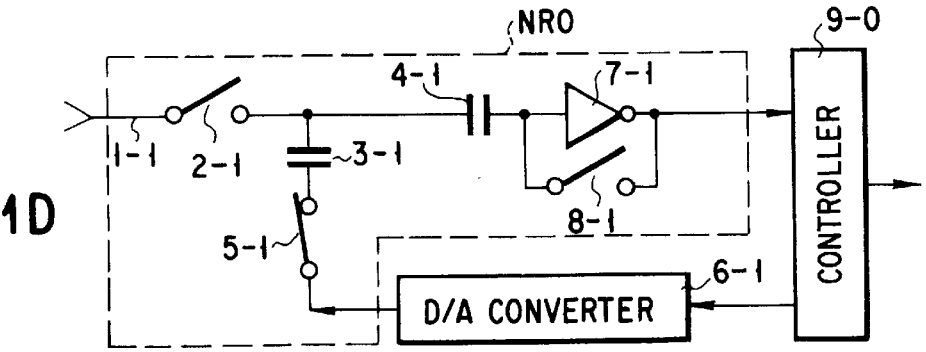

As shown in FIG. 1D, the switches 2-1 and 8-1 are turned OFF and the switch 5-1 is turned ON, so that the reference voltage Vref is output from the D/A converter 6-1. The reference voltage Vref is obtained by counting clocks in a counter in the controller 9-0 and applying its count value to the D/A converter 6-1. The counter is reset by a head of the next horizontal drive signal.

With the switches 2-1 and 8-1 OFF and the switch 5-1 ON, a combined capacitor corresponding to a series-coupled capacitors 3-1 and 4-1 is connected to the input of the inverter 7-1 to provide the reference voltage Vref.

FIGS. 2A to 2H show the waveforms of the input voltage INVin and output voltage INVout of the inverter 7-1 which are involved with a time variation of the reference voltage Vref. For the output voltage INVout, those dotted intervals are in a definite state. FIG. 2A corresponds to a horizontal drive signal (HD); FIG. 2B, the input signal (Vin); FIG. 2C, an ON/OFF operation waveform of the switch 2-1; FIG. 2D, an ON/OFF operation waveform of the switch 5-1; FIG. 2E, an ON/OFF operation waveform of the switch 8-1; FIG. 2F, a waveform of the reference voltage (Vref); FIG. 2G, a waveform of the input voltage (INVin) of the inverter 7-1; and FIG. 2H, a waveform of the output voltage (INVout) of the inverter 7-1.

Explanation will be given below about the cases above with the use of associated numerical expressions.

Since, at time t1, the reference voltage Vref is set to a Vo and the input voltage is given by Va, it follows that, with the switch 5-1 side as a reference, a voltage (Va−Vo) is stored in the capacitor 3-1.

At time t2, the inverter 7-1 is biased to the threshold voltage Vth with the switch 8-1 ON. And the switch 2-1 is turned ON, so that a voltage (Vth−Vb) is stored in the capacitor 4-1 with the switch 2-1 side as a reference.

With the switches 2-1 and 8-1 OFF and the switch 5-1 ON, voltages on the capacitors 3-1 and 4-1 are held and, when the reference voltage Vref is supplied to the switch 5-1, the input voltage of the inverter 7-1 becomes.

$$\text{INVin} = (Vth - Vb) + (Va - Vo) + Vref \tag{1}$$

Here, rearranging this equation for each terminal, it follows that $$\text{INVin} = (Vth) + (Va - Vb) + (Vref - Vo) \tag{2}$$

That is, the input voltage of the inverter 7-1 becomes a sum of the potential difference (Va−Vb) of input voltages at times t1 and t2, the threshold voltage (Vth) and the potential difference (Vref−Vo) of the reference voltage. As shown in INVin in FIGS. 2A to 2H, during a portion of a time in which the voltage Vref is varied, the input voltage INVin becomes the threshold voltage Vth when the potential difference (Va−Vb) and potential difference (Vref−Vo) of the reference voltage become equal to each other. The output of the inverter 7-1 is changed at when the inverter input voltage acrosses the inverter threshold voltage. As a result, the inverter 7-1 acts as the voltage comparator (inverting circuit). That is, $$(Va - Vb) + (Vref - Vo) = 0$$

Rearranging the equation above, $$(Va - Vb) = -(Vref - Vo)$$

at which time Equation (2) becomes INVin=(Vth) and hence the output of the inverter 7-1 is changed.

In operation, the present circuit is not sensitive to that DC component in the input voltage, which produces noise on the signal line, and works as a noise reducing circuit. Further, the present circuit has also no DC-sensitive to the reference voltage and it can be designed as a simpler circuit arrangement without the need to compensate the DC offset with respect to the D/A converter 6-1 side for generating the reference voltage.

As shown in FIGS. 2A to 2H, if the high level time period of the output of the inverter 7-1 is counted by the counter with the waveform of the reference voltage as a ramp waveform, it is possible to obtain a digital value corresponding to the input signal level as set out above.

It is possible to control the A/D conversion gain simply by varying the amplitude of the reference voltage. In a camera using the solid-state image pickup device, for example, an AGC (automatic gain control) circuit is provided which automatically increases the gain of the amplifier when an adequate amount of signal is not obtained in low illumination. In this case, an amplitude variable means for setting the amplitude of the reference voltage may be provided as the gain control amplifier. As the reference voltage amplitude control method, various methods can be conceived, such as a bias adjusting method and a clock speed of the counter varying method.

Although, in the drawing, the switches are shown like a mechanical structure, but they are comprised of integrated semiconductor switches, such as a CMOS type, in real practice.

FIG. 3 shows another embodiment of the present invention. This embodiment builds, as the solid-state image pickup device, an image pickup section, noise cancelling circuit and controller in a one-chip structure.

One pixel block PB11 in the image pickup section will be explained below as a typical structure. In the pixel block PB11, a series-connected array of a switch 402 and photo sensing element 401 is situated between a power source 400 and a ground potential, and an input terminal of an amplifier 403 is connected to a connection point between the switch 402 and the light receiving element 401, and an output terminal of the amplifier 403 is connected to a signal read-out line (vertical line) VL1 through a switch 404.

Although explanation has been given above about the pixel block PB11 as a typical structure, the other pixel blocks have the same structure as set out above. That is, those pixel blocks PB12 to PBnm (m: a horizontal direction pixel number, n: a vertical direction pixel number) have the same structures as set out above. The pixel blocks PB11, PB12, . . . , PB1$m$ show a pixel array in a first horizontal line direction and the pixel blocks PB21, PB22, . . . , PB2$m$, a second horizontal line direction pixel array. Since the respective pixel block contains the same structure, the same reference numerals are attached to the corresponding component parts. The vertical direction array of the respective pixel blocks are commonly connected to the corresponding signal read-out lines (VL1 to VL$m$).

To the respective signal taking-out lines VL1 to VL$m$ the corresponding noise cancelling circuits NR1 to NR$m$ are connected.

Since the respective noise cancelling circuits are of the same structure, one will be explained below as a typical example. The signal read-out line VL1 is connected through a switch 2-1 to a connection point of one electrode of a capacitor 3-1 and that of one electrode of a capacitor 4-1. The other electrode of the capacitor 3-1 is connected through a switch 5-1 to an output terminal of a D/A converter 311.

The other electrode of the capacitor 4-1 is connected to the input terminal of an inverter 7-1, serving as a comparator, and through a switch 8-1 to the output terminal of the inverter 7-1. The output terminal of the inverter 7-1 is connected to a gate terminal G of a latch circuit 11-1 constituting a controller.

A latch circuit 11-2 is so provided as to correspond to the noise cancelling circuit NR2. The output of an inverter 7-2 in the noise cancelling circuit NR2 is supplied to a gate terminal G of the latch circuit 11-2. In this way, the latch circuits 11-1 to 11-$m$ are so provided as to correspond to the noise cancelling circuits NR1 to NR$m$. These latch circuits 11-1 to 11-$m$ latch a count value of a common counter 312 at a time when the outputs of the inverters of the corresponding noise cancelling circuits are inverted, respectively. The output of the counter 312 is further input to the D/A converter 311.

The basic operation of the respective noise cancelling circuits NR1 to NR$m$ is the same with explanation that explained in conjunction with FIG. 1 and the D/A converter 311 is shared among the noise cancelling circuits NR1 to NR$m$. The counter 312 is reset by a leading edge of the horizontal drive signal HD and counts clocks CLOCK. The horizontal drive signal HD and clock CLOCK are also supplied to a timing generator 313 and generate timing signals, such as various kinds of switch control. The controller 9-0 as shown in FIG. 1A corresponds to the counter 312, timing generator 313, latch circuits 11-1 to 11-$m$, latch circuits 12-1 to 12-$m$, scanning switches 13-1 to 13-$m$, etc.

The latch circuits 12-1 to 12-$m$ are so provided as to correspond to the latch circuits 11-1 to 11-$m$ and they latch those digital values, which are latched to the corresponding latch circuits 11-1 to 11-$m$, at a time in a timing of the horizontal drive signal HD. The output terminals of the latch circuits 12-1 to 12-$m$ are connected to the scanning switches 13-1 to 13-$m$, respectively. These scanning switches 13-1 to 13-$m$ are sequentially turned ON during one horizontal period and derive the digital values of an imaging signal corresponding to one scanning onto an output line 70.

FIGS. 8A to 4M show a timing chart for explaining the operation of the image pickup device by way of example. FIG. 4A shows the horizontal drive signal (HD) and FIGS. 4B and 4C, signal voltages Vin1 and Vin2 of vertical lines VL1 and VL2. FIG. 4D shows an ON/OFF timing of the switches 2-1 to 2-$m$; FIG. 4E, an ON/OFF timing of the switches 5-1 to 5-$m$; and FIG. 4F, an ON/OFF timing. FIGS. 4H and 4I show the input and output of the inverter 7-1 and FIGS. 4J and 4K, the input and output of the inverter 7-2. FIGS. 4L and 4M show an ON/OFF timing of the scanning switches 13-1 and 13-2.

Figure 5A:
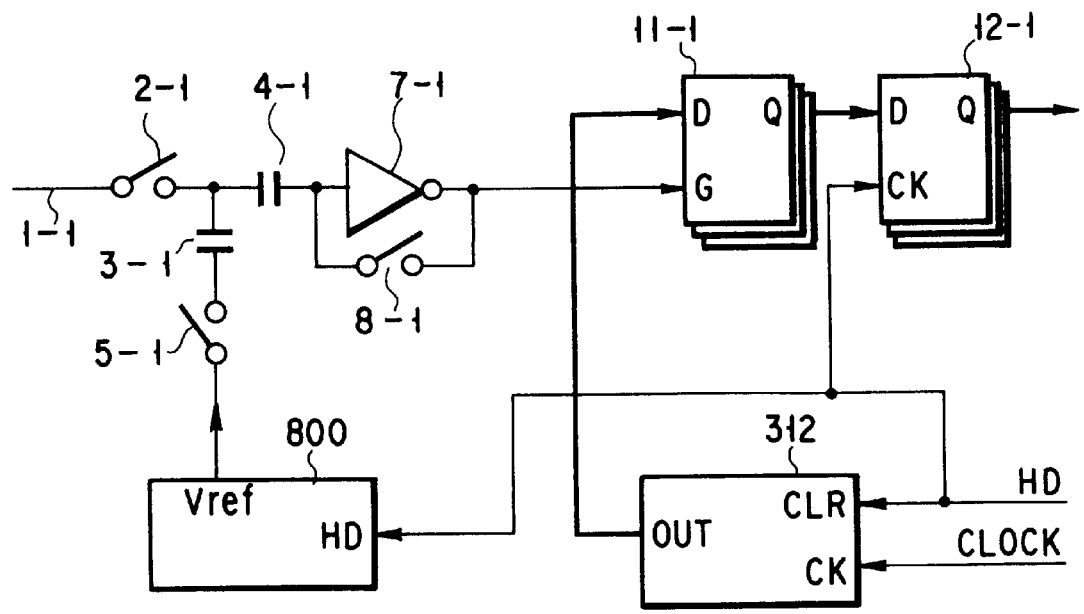
FIG. 5A is a view showing a basic circuit according to another embodiment of the present invention.

FIG. 5A shows another embodiment of the present invention. In FIG. 5A, the same reference numerals are employed to designate those parts or elements corresponding to those shown in FIG. 3.

Figure 5B:
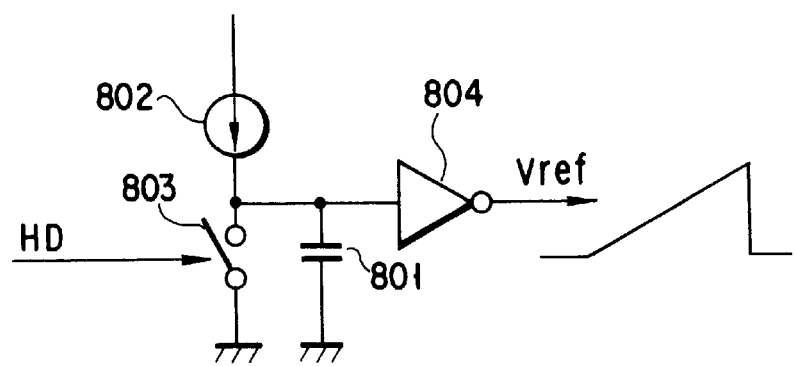
FIG. 5B is a view showing a practical form of a reference voltage generator in FIG. 5A.

FIG. 5A shows a basic arrangement and FIG. 5B shows an example of a generator 800 for generating a reference voltage Vref. Although, in the arrangement of FIG. 3, the generator for generating the reference voltage Vref has been explained as being the D/A converter 311, the reference voltage generator 800 may be comprised of a circuit as shown in FIG. 5B.

The reference voltage generator in FIG. 5B is of such a type that, with a switch 803 rendered ON by a horizontal drive signal HD, an electric charge in a capacitor is discharged and, next with the switch 803 rendered OFF during a scanning period, the capacitor 801 is charged from a current source 802. An output during this charging is output as the reference voltage Vref through an amplifier Vref.

FIG. 6A shows another embodiment of the present invention.

FIG. 6A shows a basic structure and is different from FIG. 5A in that the output of the inverter 7-1 is input, as an inverted replica, to the input of the latch circuit 4-1. This is the case where the logic is inverted with respect to the preceding embodiment and, as the reference voltage generator 900, use may be made of one for obtaining the characteristic of a discharge curve based on a time constant as shown in FIG. 6B.

A reference voltage generator in FIG. 6B is of such a type that a parallel circuit of a capacitor 901 and resistor 906 is connected between an input terminal of an amplifier 904 and ground. A DC power source is connected via a switch 903 to the input terminal of an amplifier 904. The switch 903 is controlled as follows. A horizontal drive signal HD is supplied to a data input terminal of a D type flip-flop circuit 907. A Q output terminal of the flip-flop circuit 907 is connected to a data input terminal of a D type flip-flop circuit 908. A Q output terminal of the flip-flop circuit 908 is supplied to one input terminal of an AND circuit 909. An inverted output of the flip-flop circuit 907 is supplied to the other input terminal of the AND circuit 909. A clock is supplied to clock input terminals of the flip-flop circuits 907 and 908. By doing so, at a time when a horizontal drive signal falls, a positive logic output is obtained, at a clock speed, from the AND circuit 909. With a switch 903 ON, an electric charge is charged in the capacitor 901 and the switch 903 is turned OFF. By doing so, the charge in the capacitor 901 is discharged exponentially, through the resistor 906, with a CR time constant.

FIGS. 7A to 7H are a timing chart showing the operation of the present embodiment in FIGS. 6A and 6B. FIG. 7A shows a horizontal drive signal (HD); FIG. 7B, an input signal (Vin); FIGS. 7C, 7D and 7E, the waveform diagrams of the timing of the switches 2-1, 5-1 and 8-1; FIG. 7F, a waveform of the reference voltage Vref; and FIGS. 7G and 7H, the waveforms of the input and output voltages of the inverter 7-1.

In this example, the reference voltage Vref rises at a trailing edge of the reference synchronizing signal and falls gradually. During the portion of the falling, when it reaches a threshold value, then the output of the inverter 1-7 is changed from a negative to a positive value. At this time of change, the count value of the counter 312 is latched to the latch circuit 11-1.

As the variation inclination of the reference voltage Vref above it may be possible to provide various characteristics, such as a linear and a nonlinear characteristic. By doing so, it is possible to obtain a logarithmic compressed data as an output.

The present invention is not restricted to the above-mentioned embodiments and various changes or modifications of the present invention may be made within the scope of the present invention. For example, the reference voltage is generated from the D/A converter. The input of the D/A converter is supplied from the counter. With full bits initially set, the counter is decremented one by one and re-set with the horizontal period.

Figure 9:
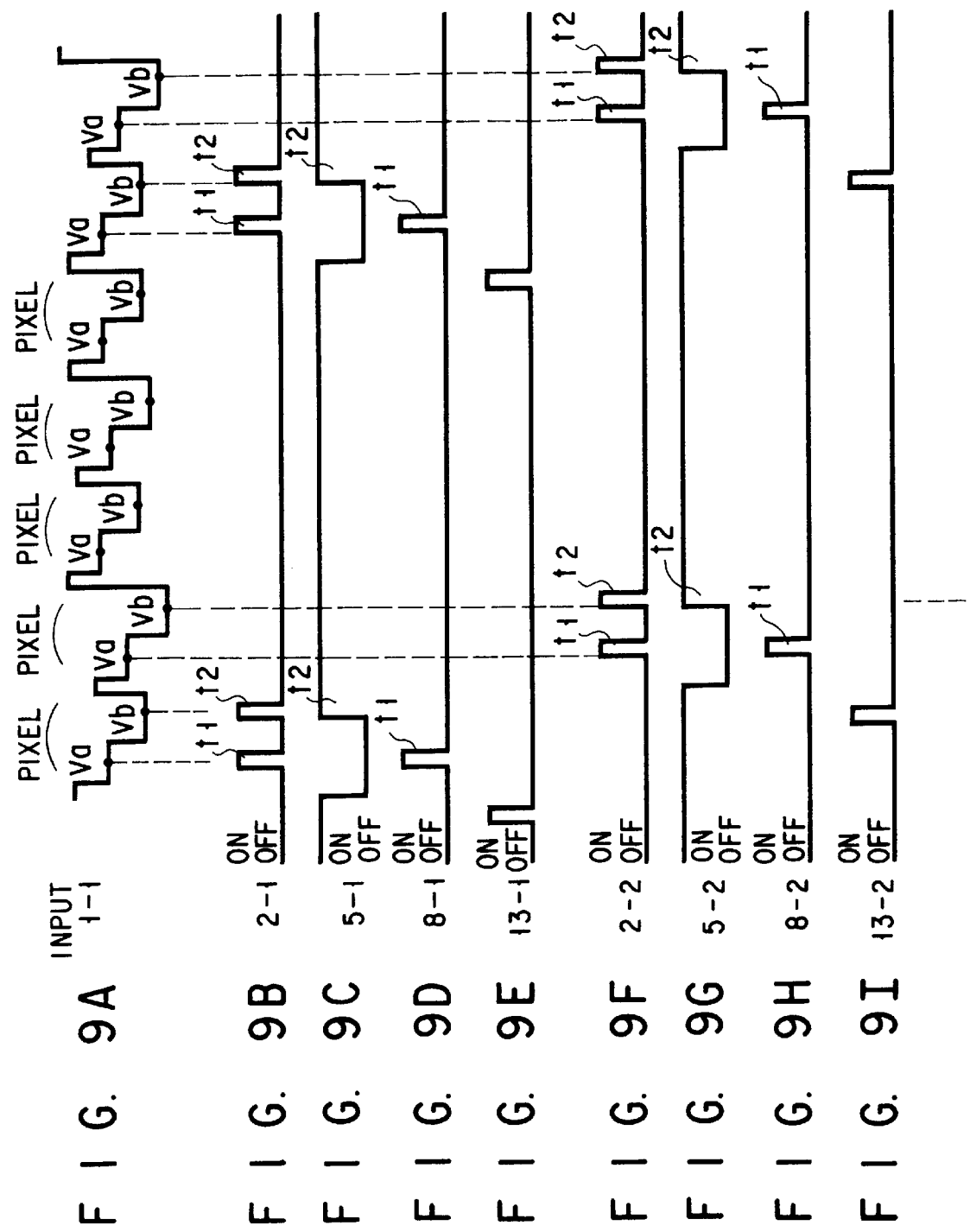
FIGS. 9A to 9I are a timing chart showing signals of associated parts, as well as timing pulses, for explaining the operation of the FIG. 8 circuit.
Figure 11:
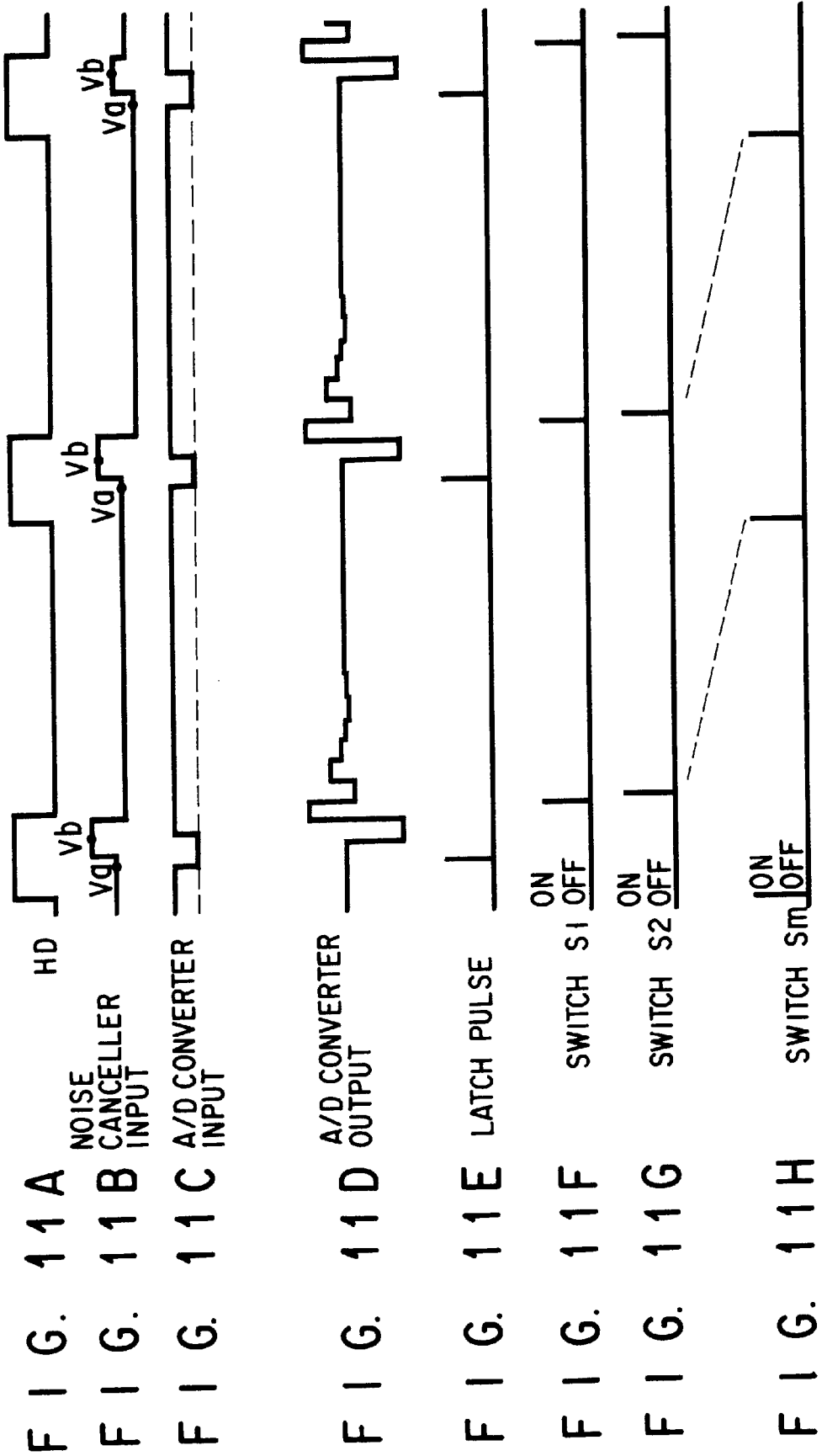
FIGS. 11A to 11H are a timing chart showing signals of associated parts, as well as timing pulses, for explaining the operation of an image pickup device.
Figure 13:
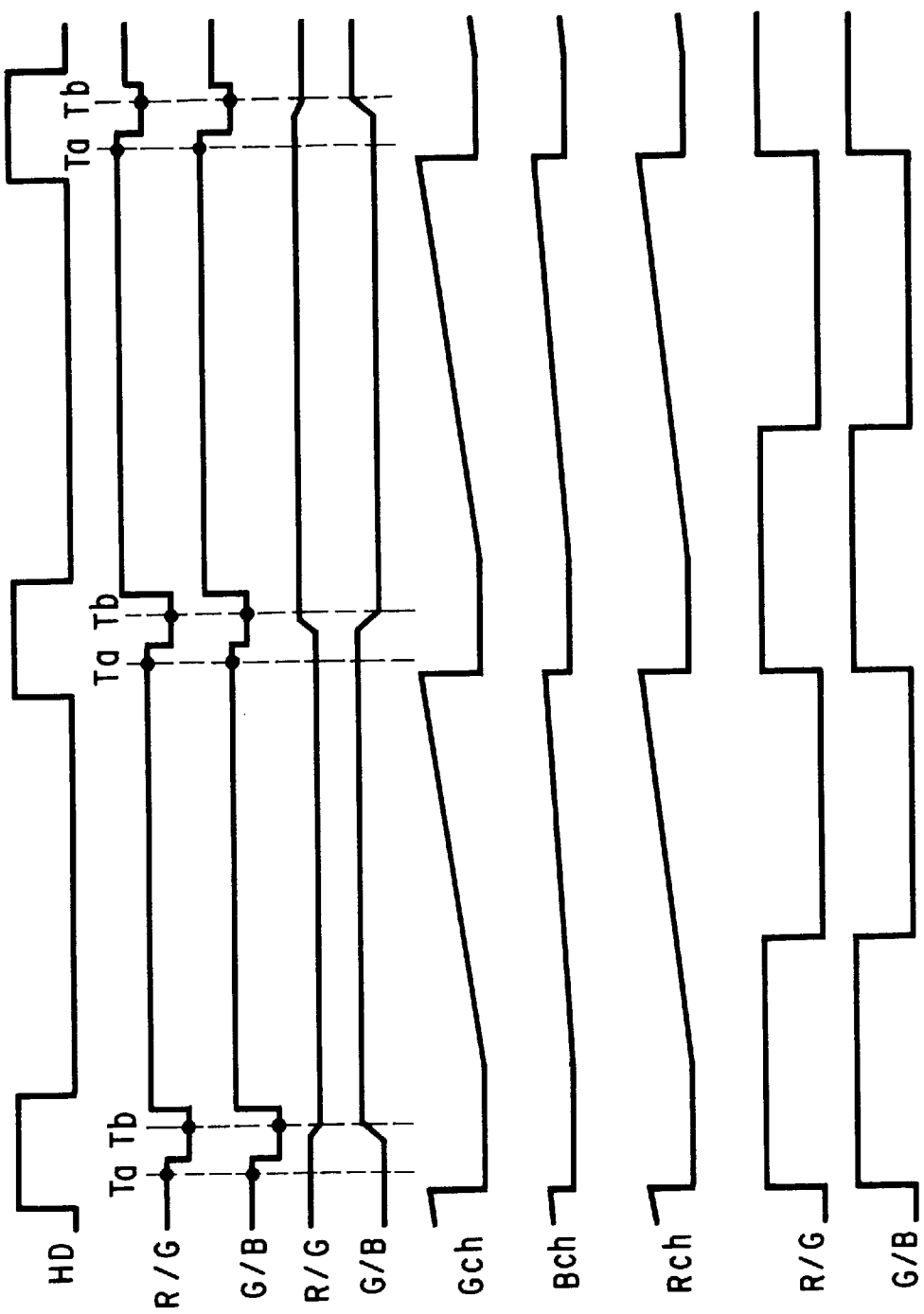
FIGS. 13A to 13J are a timing chart showing signals of associated parts, as well as timing pulses, for explaining the operation of the FIG. 12 image pickup device.
Figure 15:
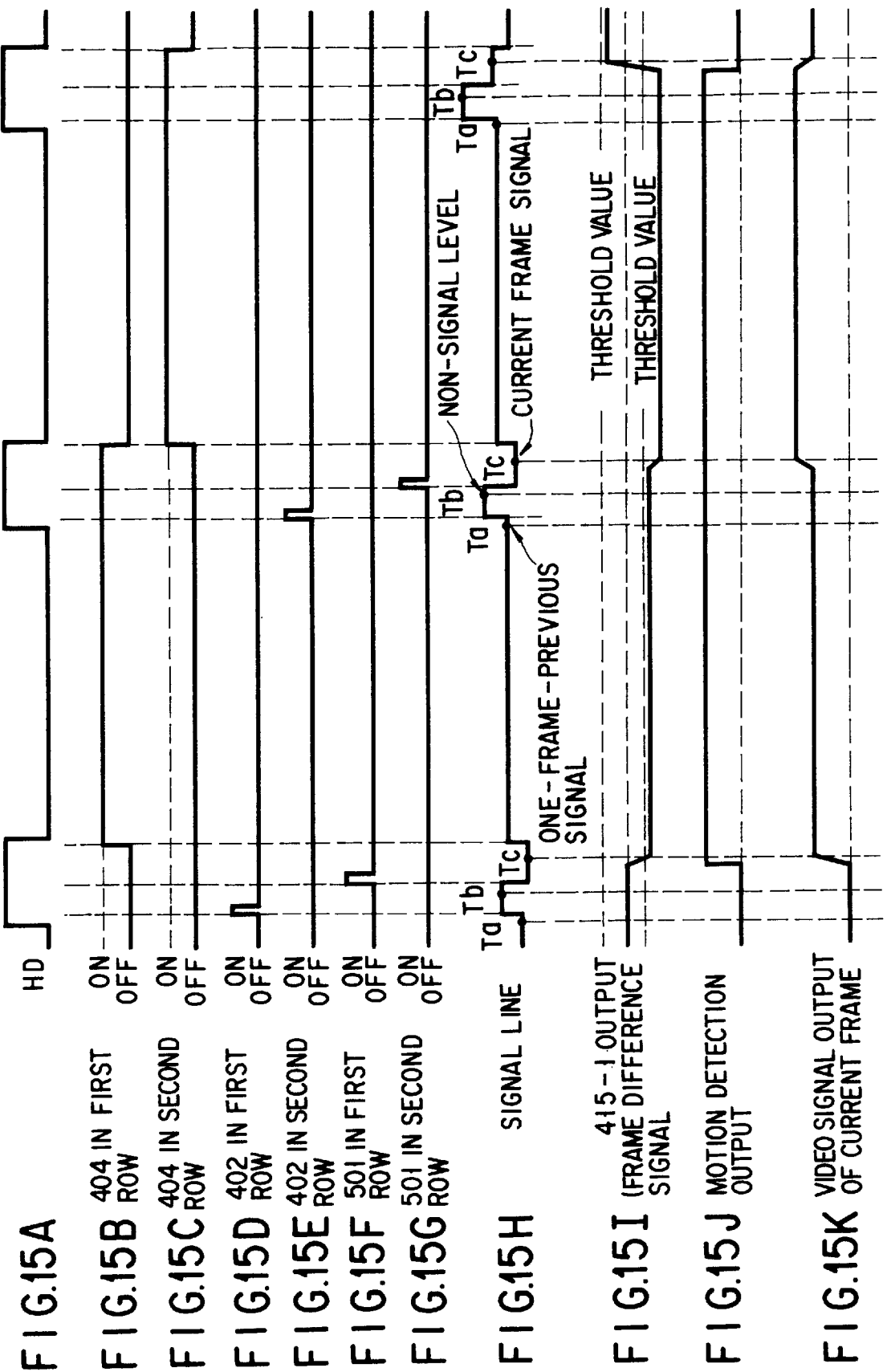
FIGS. 15A to 15K are a timing chart showing signals of associated parts, as well as timing pulses, for explaining the operation of the FIG. 14 device.

FIG. 8 shows another embodiment of the present invention and FIGS. 9A to 9I show a timing chart for explaining the operation of the embodiment. The embodiment above is proved effective to detecting the amplitude variation component in each pixel of a DC varying signal read from a CCD solid-state image pickup device for instance. The embodiment in FIG. 8 is such that the basic unit in FIGS. 1A to 1D is arranged in parallel in a horizontal direction in m numbers relative to an input terminal 1-1, that is, in a manner to correspond to the number of pixels for instance. Controllers 9-1 to 9-m comprise a successive approximation controller and scanning switch. The outputs of the respective controllers 9-1 to 9-m are taken out, respectively, through the corresponding scanning switches 13-1 to 13-m. In the example in FIGS. 9A to 9I, although the signal involved is repeated in 5 pixel units, a signal in the number of pixels corresponding to one horizontal period is continuously input in actual practice. FIG. 9A shows an input signal to the input terminal 1-1 and the input signal comes from a horizontal transfer section of, for example, a CCD type image pickup section. FIGS. 9B to 9I show the ON/OFF operation waveforms of the switches as shown in FIG. 8.

The solid-state image pickup device used in the embodiment above is suitable to such a type as to take out the output of the photo sensing element through a charge coupled device. That is, the embodiment above is of such a type that, with respect to a signal obtained as a time continuous signal over one horizontal line, not the signal treated one line at a time as in the previous embodiment, each block is operated in a shifted timing as the output signal of the CCD image pickup device having a floating diffusion amplifier. By doing so, the signal component has its noise reduced irrespective of any DC variation and is output as a noised reduced signal.

According to the present invention as set out above, noise reduction is positively achieved in a simpler structure.

Although the operation of the noise cancelling circuit has been principally explained above, the image pickup device of the present invention is so designed as to achieve noise cancellation even in a combination of its drive method and specific arrangement.

Below, the embodiment will be explained as the whole image pickup device equipped with such a noise cancelling effect.

FIG. 10 shows a basic arrangement of an image pickup device according to an embodiment of the present invention and FIGS. 11A to 11G show a timing chart for explaining its operation.

In FIG. 10, 400 shows a power source and it is connected to a plurality of power source lines. The power source lines are comprised of a plurality of lines arranged in a vertical direction and extend in a horizontal direction. Photodiodes 401 are connected, respectively, through switches 402 to the power source lines and arranged as a plural array.

The photodiode 401, switch 402, amplifier 403 and switch 404 are combined to provide one pixel area and the same reference numerals are employed to designate elements corresponding to those in the above pixel section.

The amplifier 403 is provided in each photodiode 401 and a very weak signal current, being amplified, is output to a vertical scanning switch 404 side. With the switch 404 in any one line (horizontal direction) being selected as ON, the output of the amplifier 403 is supplied to a noise canceller circuit 405 through a corresponding analog signal line.

With the switch 404 ON or OFF, a voltage Va corresponding to the signal is output from the amplifier 403. When the reset switch 402, once being closed, is opened, an electric charge in the photodiode is swept away. With the switch 404 ON or OFF, a voltage Vb corresponding to the lack of a signal is output from the amplifier 403. The noise cancellers 405 (corresponding to NR1, NR2 . . . in FIG. 3) cancel noise voltages by taking a difference voltage between the voltages Va and Vb and noise-reduced signal voltages are supplied to A/D converters 406 (corresponding to the latches 11-1, 11-2 . . . in FIG. 3). The output signals of the A/D converters 406 (corresponding to the latch circuits 12-1, 12-2, . . . in FIG. 3) are latched to latch circuits 407. The outputs of the latch circuits 407 are sequentially switched by scanning switches 408 (corresponding to switches 13-1, 13-2, . . . in FIG. 3) and derived as scanning signals.

After the signal is latched by the latch circuit 407, since the output of the A/D converter 406, even being varied, exerts no influence on the scanning signal output, the noise canceller 405 and A/D converter 406 can start the A/D conversion of the next signal. Therefore, most of one scanning period can be allocated to the noise reduction and A/D conversion.

Since, in a 200 million-pixel image pickup device of a high definition camera, one pixel time is about 13.5 ns and one scanning time period is about 29.6 μs, about 2000-fold time can be applied. For this reason, the A/D converter 406 is of a relatively low speed sequential comparison type and, even if a 16-bit output is obtained, a comparison time per bit can be extended up to an about 100 pixel time and the band width of the analog signal system can be largely reduced to $\frac{1}{100}$, so that a noise mixing amount can be reduced.

As shown in FIGS. 11A to 11H, a signal voltage corresponding to the difference between Va and Vb is obtained during the horizontal drive signal HD period and is input to the A/D converter 406. The A/D converter 406, being digitally converted, may be done so immediately before a maximal-level horizontal drive signal. And, when the latch circuit 407 latches the conversion data immediately before the horizontal drive signal, the next signal voltage is taken and subjected to A/D conversion processing. The timing pulse of the respective timing pulse as well as the timing pulse and digital data of the noise canceller 405, A/D converter 406 and latch circuit 407 are output from a system controller 409. The system controller 409 corresponds to the counter 312, D/A converter 311, timing generation circuit 13, and so on.

FIG. 12 shows another embodiment of the present invention.

The embodiment includes two photodiodes in one pixel section and the output of the photodiode is input through either one switch to the amplifier 403. Even in this case, the arrangement of one pixel section is the same as set out above and the same reference numerals are employed to designate parts or elements corresponding to those shown in the preceding embodiment. A color filter is provided for the respective photodiode. There is a row where R, G, R, G, R, G, . . . are sequentially repeated in a horizontal direction and a row where G, B, G, B, G, B, . . . sequentially repeated. These kinds of rows are alternately arranged in a vertical direction, so that, as viewed in the vertical direction, there is a column where R, G, R, G, R, G, R, G, . . . are repeated and a column where G, B, G, B, G, B, . . . are repeated. In this connection it is to be noted that R, B and G represent red, blue and green, respectively.

That is, on the photodiodes 401a and 401b in a matrix array, a color filter array is provided at a vertical and a horizontal two-pixel period. The color filter array allows the transmission of light of a given wavelength range. The green, blue and red color light are incident on the respective photodiodes 401 marked as G, B and R. The respective light is subjected to photoelectric conversion and stored as a signal electric charge of each color.

Viewing the arrangement of the respective pixel section, a series circuit of a switch 402 and capacitor 602 is connected between a power supply line and ground and an input terminal of an amplifier 403 is connected to a connection point of the switch 402 and the capacitor 602. Either one of the outputs of the diodes 401a and 401b can be supplied through a corresponding switch 601a or 602b to input terminal of the amplifier 403.

The signal charge of the photodiode 401a or 401b is read out through the switch 601a or 601b and converted to a variation level of a voltage corresponding to a signal amount supplied to the capacitor 602 connected to the input of the amplifier 403. The output of the amplifier 403 is selected by a switch 404 for each row and supplied to the noise processing section 415.

After a voltage on the capacitor 602 is initialized with the switch 402 ON, the switch 402 is turned OFF. A voltage at a time of no signal is output from the amplifier 403 and a voltage Ta at this time is sampled as a reference voltage to the noise processing section 415. Let it be assumed that a signal charge on the photodiode 401a on the first row having, for example, red and green color filters is read out. The color signal is output as an output voltage of the amplifier 403. The color signal is output as an output voltage variation of the amplifier 403. A signal voltage Tb is sampled by the noise processing section 415. The noise processing section 415 outputs only a signal component by taking a difference voltage between a reference voltage Ta and a signal voltage Tb.

The outputs of the noise processing sections 415 corresponding to the corresponding pixels are supplied to comparators 605a and 605b corresponding to the horizontal array. The comparators 605a and 605b are arranged alternately in the horizontal direction. To the comparators 605a and 605b a ramp (ramp wave) voltage is supplied from the corresponding ramp voltage generator. That is, to the comparator 605b the ramp voltage for the blue color and ramp voltage for a green color are alternately supplied for each horizontal period and to the comparator 605a the ramp voltage for the green color and ramp voltage for the red color are alternately supplied during the horizontal period.

The comparators 605a and 605b are of such a type as to, when the ramp wave from the corresponding ramp voltage generator is made equal to the input signal voltage, have their outputs inverted to provide latch pulses. By the latch pulses the corresponding latch circuits 607 latch a count value of the counter 606. The count value is a so-called A/D conversion value.

The outputs of the above-mentioned latch circuits 607 are delivered at a time to a shift register 608 and sequentially transferred in the horizontal period. The output of the shift register 608 is delivered as a digital video signal.

The ramp voltage for the blue color is output from a Bch ramp wave generator 603b, the ramp voltage for the green color is output from a Gch ramp generator 603g and the ramp voltage for the red is output from a Rch ramp generator 603r. The slopes of the ramp voltages are set in proportion to a signal amount at a time when a white color object is taken. By doing so, the outputs of the comparators 605a and 605b at that time are switched at the same timing and it is possible to obtain the same A/D conversion value as a color-balanced one.

The above-mentioned noise processing section 415 corresponds to the switches 2-1, 5-1 and capacitors 3-1, 4-1 in FIG. 3; the comparators 605a, 605b correspond to the inverters 7-1, switch 8-1; and the latch circuit 607 corresponds to the latch circuit 11, etc.

In the arrangement shown in FIG. 12, assuming that a signal charge in the photodiode 401a on the first row having the red and green color filters is read out, the switch 601 is turned ON. In this way, the switch 604 is set to a x contact side, a red signal and ramp voltage for the red color are input to the comparator 605a and a green signal and ramp voltage for the green color are input to the comparator 605b. And a digital value corresponding to the output signal of the respective pixel is latched to the latch circuit 607 and supplied to the shift register 608.

In the next horizontal period, signal charges of the photodiodes on the second row having the green and blue color filters are read out during the next horizontal period. At this time, the switch 601a is turned OFF and the switch 601b is turned ON. Further, the switch 604 is set to a y contact side.

By doing so, a green signal and ramp voltage for the green color are input to the comparator 605a and a blue signal and ramp voltage for the blue color are input to the comparator 605b. And a digital value corresponding to the output signal of the respective pixel is latched to the latch circuit 607 and supplied to the shift register 608. As a result, a digital video signal output can be obtained as a white-balanced one.

A similar operation is also carried out with respect to the next row. When the photodiode 401a is 13J show the outputs of comparators 605a and 605b.

The ramp wave voltages can be output in the R, G and B channels of their own and are effective in the case where the R-G and G-B color balances are obtained. Further, the waveforms of the ramp waves enables the obtainment of voltages of a given characteristic by initially storing voltage waveform generation data in, for example, a ROM. By doing so, it is possible to obtain correction color signals in accordance with optical levels or by initially providing the ramp waves to the characteristics necessary for color processing.

Further, it is possible to store data for the generation of voltages of various ramp characteristics in memory and to selectively use them in accordance with the surrounding circumstances. It is, also, possible to provide an image pickup device of very high flexibility.

FIG. 14 shows a block diagram showing another embodiment of the present invention.

In a remote monitoring camera for monitoring any invader it is necessary that the camera be connected through a communication line and that a motion image be sent at a relatively low data transfer rate. In such a case, the data is transferred with a luminance varying area as a center and a communication rate drops at a communication rate of no problem, provided that the invader moves at all times. The practice has been made to, for example, take the output of the monitoring camera in a frame memory as shown in FIG. 16, compare an image of a one-frame time difference and a current image and to detect a given motion area from a luminance level difference.

A respective pixel of a solid-state image pickup device in FIG. 14 comprises a photodiode 401, readout switch 601, capacitor 602 for charge voltage conversion, reset switch 402, amplifier 403 and select switch 404. A series connection of the switch 402 and capacitor 602 is provided across a power source and ground and a series connection of the switch 601 and photodiode 401 is connected across a connection point between the switch 402 and the capacitor and ground. The connection point between the switch 402 and the capacitor 602 is coupled to a read signal line via the switch 404.

Since the respective pixel section is the same arrangement as set out above, explanation will be given below in conjunction with one pixel section with the same reference numerals employed to designate parts or elements corresponding to those shown above and further explanation omitted for brevity sake. The operation of one row pixel section will be set out below.

Here, respective read signal lines are arranged as a parallel array in the horizontal direction and extend in a vertical direction with their both end sides connected between noise processing units 415-1 and 415-2.

In the above-mentioned pixel section, on the other hand, the capacitor 602 provided for each diode continues to be retained while the switches 402 and switches 601 are turned OFF. That is, the capacitor 602 can retain the output voltage of the amplifier until, after one frame, access is again gained to the same pixel section. As a result, when the switch 404 is turned ON it is possible to provide a one-frame-previous signal output from the amplifier 403.

The noise processing section 415-1 is so controlled as to sample a voltage Ta, at that time, as a reference voltage. Then, after the turning ON of the reset switch 402 and initialization of the voltage on the capacitor 602 the reset switch 402 is turned OFF and a voltage at a non-signal time is output from the amplifier 403.

The noise processing section 415-2 samples a voltage at that time and uses it as a reference voltage Tb. Next, when a readout switch 601 is turned ON, a signal charge is read from the photodiode 401 and a voltage corresponding to the current frame signal is output from the amplifier 403. This readout voltage is taken into the noise processing sections 415-1 and 415-2. A difference voltage Tc between the readout voltage thus taken and the reference voltage is obtained at the respective noise processing sections 415-1 and 415-2.

By doing so, a difference voltage component from the one-frame-previous signal, that is, a luminance variation component, is output from the noise processing section 415-1 and a current frame signal voltage component is output from the noise processing section 415-2.

The luminance variation component is input to a comparison circuit 804 where window comparison is made. The comparator 804 outputs a 1 when there occurs a luminance variation above a threshold level and a 0 when there occurs a luminance variation less than the threshold level.

This voltage value is read out through scanning switches 802 sequentially closed by a scanning shift register 801 and output as a scanning signal showing a position where there occurs a large luminance variation. The output terminals of the noise processing sections 415 and parabolic wave generator 805 are connected to comparators 605 corresponding to the respective pixel section.

FIGS. 15A to 15K show the states of the first and second switches and those of signals on the signal lines. With respect to a time from the output of the noise processing section 415-2 the parabolic wave generator 805 generates a voltage proportional to the square of the time and the counter 606 generates a count value proportional to a count value. The output of the comparator 605 is inverted at a time when the input voltage and parabola wave voltage are equal to each other and, at this time, the output of the counter 606 is held in the latch circuit 607.

As a result, it is possible to obtain an A/D conversion value proportional to the square of the input signal. This has a conversion characteristic near a gamma correction characteristic of a γ=0.45 required for a video camera for correcting a gamma value (2.2) of a CRT, so that it is possible to largely simplify the digital signal processing. Although, according to this embodiment, a frame-to-frame difference is converted to a binary equivalent, it is possible to obtain a multi-leveled digital value with the use of the A/D converter.

The output of the latch circuit 607 is further latched to the latch circuit 806 and derived through a corresponding switch 807 operated in a proper timing. Switches 807 are driven by the scanning outputs of a decoder 808 operated based on the timing pulse of a timing generator 809.

Figure 17:
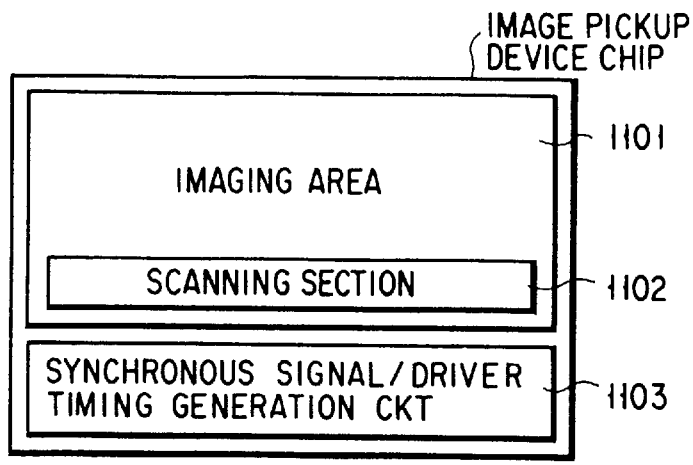
FIG. 17 is an explanatory view showing an arrangement of a one-chip image pickup device according to the present invention.

FIG. 17 shows an example where a synchronous signal and drive timing generator 1103 and image pickup area 1101 are built on the same chip. Since analog signals have conventionally been scanned in analog form, noise in the timing generator is mixed in the signal and emerge as vertical streak noise on an image screen.

According to the image pickup device of the present invention, a signal bandwidth of an analog signal is narrower and contains less noise and the A/D converter operates in the same timing, and even if there is any noise contained there, it appears simply as a linear degeneration of the A/D conversion characteristic and appears not prominent on the image screen. Further, reference numeral 1102 shows a scanning section as a collective unit including switches and so on.

Figure 18:
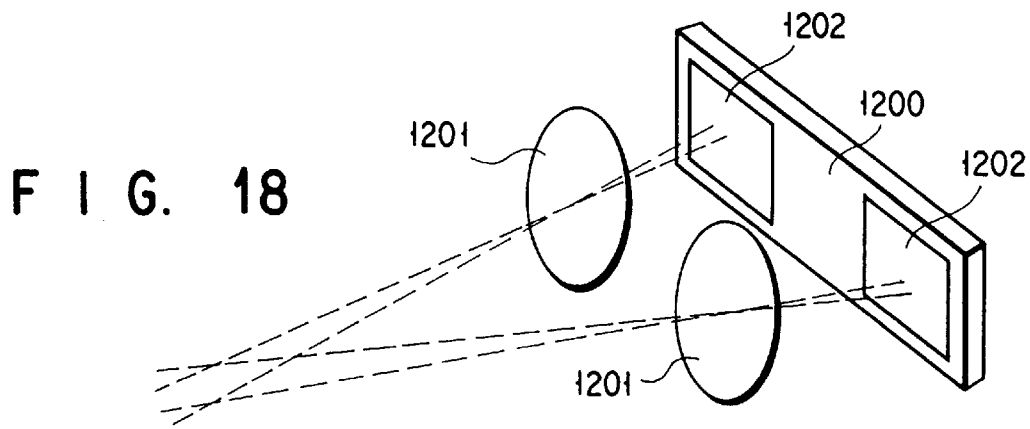
FIG. 18 is an explanatory view showing an arrangement of a depth information detection camera using the image pickup device according to the present invention.

FIG. 18 shows a schematic form of an image pickup device where an optical image of a horizontal parallax is formed by two lenses 1201 on two image pickup areas 1202 on a chip 1200 of the image pickup device to obtain depth information.

Figure 19:
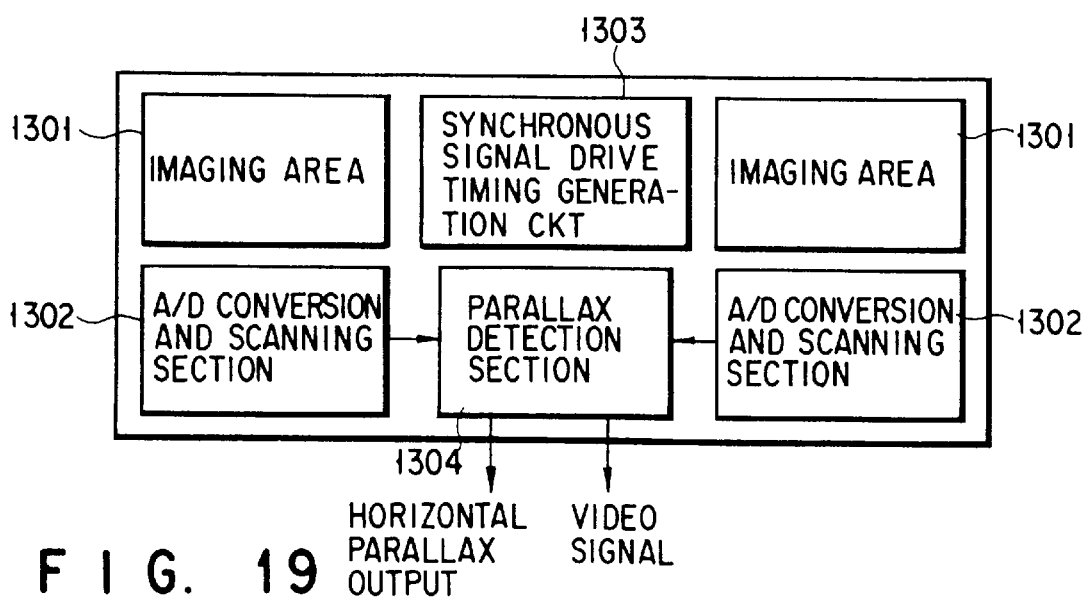
FIG. 19 is an explanatory view showing an arrangement of FIG. 18.

Such an image pickup device used therein is of such a type that video signals are input from the two image pickup areas 1301 to a parallax detection section 1304 as shown in FIG. 19 and parallax information is calculated from the correlation values. The parallax information, together with the video information, is output and can be used as a video signal having depth information. Reference numeral 1302 shows an A/D conversion/scanning section and 1303, a synchronous signal drive timing generator.

Since a scanner for taking photographing data demands high resolution, use is made of a linear sensor with a few thousands of photodiodes as one array. Upon the taking of images, mechanical scanning (vertical scanning) is made in a direction vertical to the scanning (horizontal scanning) by the linear sensor. As a result, a pixel-to-pixel sensitivity variation emerges as streaks in the vertical direction so that an image quality obtained is lowered. In order to solve this problem, the output signal of the linear sensor when a white colored object is taken is initially measured and, based on the result of measurement, gain correction is made through the digital signal processing. However, there has been a disadvantage that the streak noise can be lowered through the gain correction and hence the luminance resolution is lowered.

Figure 20:
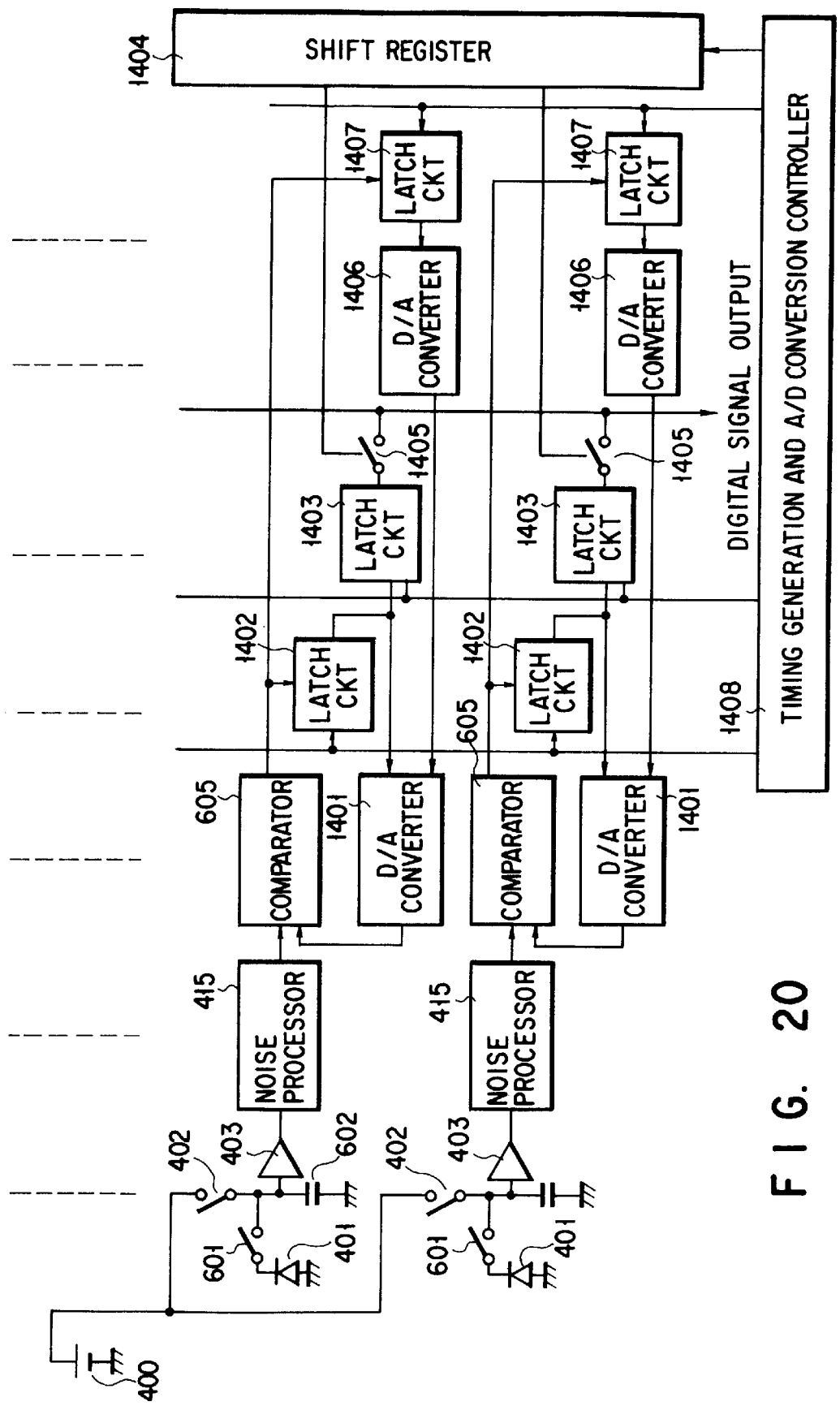
FIG. 20 is an explanative view showing an arrangement of a linear sensor using the image pickup device according to the present invention.

This disadvantage can be solved by cascade-connecting D/A converters 1401 and 1406 as shown in FIG. 20 and A/D converting the output of each pixel.

FIG. 20 shows the arrangement of a linear sensor. Each pixel section comprises a switch 402 and capacitor 602 connected in series array between a power source and ground, a photodiode 401 connected through a switch 601 to a connection point between the switch 402 and the capacitor 602 and an amplifier 403 connected at its input terminal to a connection point between the switch 402 and the capacitor 602.

The output of the respective amplifier 403 is processed by a noise processing section 415 to reduce noise involved. This noise processing section 415 corresponds to the switches 2-1 and 5-1 and capacitors 3-1 and 4-1 as shown in FIGS. 1A to 1D. It is possible to take out a signal voltage from the photodiode 401 cancelling noise in the absence of any signal. The signal voltage is supplied to a comparator 605.

The comparator 605 compares a voltage from the noise processing section 415 with a voltage from the D/A converter 1401. A voltage from the A/D converter 1401 is comprised of, for example, a voltage variable in accordance with the output of a counter. When there is a coincidence between the voltage from the noise processing section 415 and the variable voltage in the comparator 605, the coincidence detection pulse is utilized as a latch pulse to the latch circuits 1402 and 1407.

This system is equipped with the sensitivity correction or adjustment function and a measuring function. The whole operation is controlled by a timing generation/A/D conversion controller 1408. To the latch circuit 1407 a measurement count output is supplied from the controller 1408. The measurement count output is input via the latch circuit 1407 to the D/A converter 1406 where it is converted to an analog variable voltage. The variable voltage is added to the D/A converter 1401 from there to the comparator 605. In this case, an analog bias is applied to the comparator 605.

When the measurement count output is made variable while taking a subject of a given light (white) level, a count value corresponding to a variation in respective elements is latched to the latch circuit 1407. The count value, being equal among the associated elements, shows that all the elements have the same sensitivity.

Therefore, by initially storing the variation data in the controller it may be possible to correct actual image pickup data or it may be possible to apply such variation data as a ± bias to the D/A converter 1401.

At a time of taking an actual image, the count data is supplied through the latch 1402 to the D/A converter 1401. And a variable voltage is supplied to the comparator 605. When there occurs a coincidence between the variable voltage and a voltage from the noise processing section 415, a count value at that time is retained in the latch circuit 1402. The count value thus retained is latched to the latch circuit 1403. A read operation is performed through the scanning switch 1403. The noise processing section 415 removes any unrequired component from an output of the amplifier 403 by itself as set out above.

According to the sensor thus operated it is possible to compensate a variation in the sensitivity of an associated light-sensitive element and to contribute to obtaining a better image. Stated in another way, it is possible to provide the sensitivity characteristic. It is sometimes convenient to take a subject image with the imaging sensitivity less sharp at a middle and high at a marginal edge or to take a desired image the other way round. It is thus possible to freely satisfy such a demand. Further, at a time of A/D conversion, the sensitivity correction is performed without generating any round-off error. And a compact device can be obtained because it is possible to prevent a lowering in luminance resolution and to largely lower the bandwidth of an analog system. Although the sensor above has been explained as being a linear sensor, it is needless to say that the present invention can be applied to a sensor with a two-dimensional array of photodiodes. Further as the switch use is made of a semiconductor switch.

According to the present invention, an image pickup device not readily affected by extraneous noise can be realized by providing a plurality of A/D converters, effecting scanning with those digital equivalents of associated analog signals and, by doing so, largely reducing the bandwidth of the analog signal system. Further, even the digital circuit can be arranged in proximity to the image pickup device which would otherwise been impossible because it provides a noise generation source. Further it can be mounted on the same chip. These advantages effectively ensure a compact camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A noise cancelling circuit for pixel signals, comprising:
   first holding means for allowing a difference voltage between a level at a first or a second time point of an input signal and a reference potential to be held in a first capacity connected between an input terminal at the first or the second time point and a given reference potential;

second holding means for allowing a difference voltage between the level at the second or first time point and a threshold value of an inverting circuit to be held in a second capacitor connected between the input terminal and the input terminal of the inverting circuit, at the second or the first time point, connecting the input and output terminals of the inverting circuit;

reference voltage variable means for applying a reference voltage, as a bias, to the input terminal of the inverting circuit through a series circuit of the first and second capacitors, and making the reference voltage variable by making an associated digital value variable; and deciding means for deciding, as a pure input signal, the digital value when an output of the inverting circuit is inverted during a portion of a time in which the reference voltage varies.

2. A noise canceling circuit according to claim 1, wherein the reference voltage variable means comprises a counter for counting clocks and digital/analog converting means for converting an output digital value of the counter to an analog equivalent to provide the reference voltage and the deciding means is comprised of latching means for holding the output digital value of the counter when the output of the inverting circuit is changed.

3. A noise cancelling circuit according to claim 1, wherein the reference voltage variable means is comprised of means for turning an associated switch OFF, when a predetermined timing signal is inputted, to allow a power supply current to be charged in an associated capacitor to provide a varying ramp wave voltage.

4. A noise cancelling circuit according to claim 1, wherein the reference voltage variable means is comprised of means for obtaining a voltage of a varying discharge waveform by controlling an associated switch in an ON-OFF way, when a predetermined timing signal is received, to allow a power supply voltage to be charged in an associated capacitor at an ON time and a voltage on the capacitor to be discharged at an OFF time.

5. A noise cancelling circuit for pixel signals, comprising:
means for, in order to obtain a variation corresponding to a level across first and second sample points of an input signal, sample-holding a potential difference between a potential on the first sample point and a predetermined reference potential to provide a first holding voltage;

means for sample-holding a difference potential between a potential on the second sampling point and a threshold value of an inverting circuit to provide a second holding voltage;

means for supplying a third holding voltage which is obtained by a combined voltage of the first and second holding voltages to the input side of the inverting circuit and making a reference voltage, as a bias, variable through the third holding voltage; and means for obtaining a signal, corresponding to a variation state of the reference voltage, as a variation component of the input signal with the use of a timing signal which is output from the converting circuit when a combined voltage between the reference voltage and the third holding voltage reaches a threshold value of the inverting circuit.

6. A noise cancelling circuit according to claim 5, wherein the input signal is comprised of a signal taken from a corresponding light receiving element in a solid-state image pickup device.

7. A noise cancelling circuit according to claim 6, wherein the solid-state image pickup device is of such a type as to take an output of the light receiving element through an amplifier and signal line.

8. A noise cancelling circuit according to claim 6, wherein the solid-state image pickup device is of such a type as to take an output of the light receiving element through a charge coupled device.

9. An image pickup device comprises a plurality of noise cancelling sections supplied with output signals of a plurality of pixels, having reference voltage generation means for supplying a reference voltage, while allowing a variation of its amplitude, to the noise scanning sections, and having a plurality of latch sections supplied with an output of the respective noise cancelling section, wherein an internal arrangement of the noise cancelling section comprises:

first holding means for allowing a difference voltage between a level at a first or a second time point of an input signal and a reference potential of a given level to be held in a first capacitor connected between an input terminal and the reference potential;

a second holding means for allowing a difference voltage between a level at the second or first time point of the input signal and a threshold value of an inverting circuit to be held in a second capacitor between the input terminal and the input terminal of the inverting circuit, and means for switching the first and second capacitors to a series-connected state and for providing a combined voltage of the first and second capacitors as an input-side voltage of the inverting circuit, and the reference voltage generation means comprises voltage variable means for applying the reference voltage commonly to the inverting circuits of the noise cancelling section, and the latch sections comprise holding means for holding a value corresponding to the reference voltage when the output of the inverting circuit is inverted during a portion of a time in which the reference voltage of the inverting circuit varies and for holding it as a variation corresponding to the input signal.

10. An image pickup device according to any of claims 1, 5 and 9, wherein the reference voltage is generated by a digital/analog converter and the input of the digital/analog converter allows full bits to be initially set and decreased one bit at a time to provide re-setting at a horizontal period.

11. An image pickup apparatus comprising a plurality of noise cancelling sections supplied at a common input terminal with output signals from a plurality of pixels, reference voltage generation means for supplying a reference voltage, while allowing a variation of its amplitude, to the noise cancelling sections, and a plurality of latch sections supplied with the outputs of the respective cancelling sections, wherein the plurality of noise cancelling sections allow output signals of the pixel elements to be taken at different time points, an inner arrangement of the respective noise cancelling section comprises first holding means allows a difference voltage between a level at a first or a second time point of an input signal and a reference potential of a predetermined level to be held in a first capacitor connected between the input terminal and the reference potential, second holding means for allowing a difference voltage between a level at the second or the first time point of the input signal and a threshold value of an inverting circuit to be held in a second capacitor connected between the input terminal and input and output terminals of the inverting circuit, and means for switching the first and second capacitors to a series-connected state and for taking a combined voltage of the voltages of the first and second capacitors as an input-side voltage of the inverting circuit, and the reference voltage generating means comprises voltage variable means for varying a reference voltage input as a bias, together with a reference voltage, to the inverting circuit, and the plurality of latch sections hold a value corresponding to the reference voltage when the output of the inverting circuit is inverted during a portion of a time in which the reference voltage of the respective inverting circuit varies.

12. An image pickup device comprising:

a plurality of photoelectric converting elements arranged at least in a row direction;

a plurality of amplifiers for allowing output signals of the photoelectric converting elements to be delivered as outputs;

a plurality of noise cancelling means supplied with the outputs from the amplifiers and comprising first holding means for allowing a difference voltage between a Level at a first time point of an input signal and a reference potential of a given level to be held in a first capacitor connected between an input terminal and the reference potential, second holding means for allowing a difference voltage between a level at a second time point of the input signal and a threshold value of an inverting circuit to be held in a second capacitor connected between the input terminal and input/output terminals of the inverting circuit, means for switching the first and second capacitors to a series-connected state at a third time point and for taking a combined voltage of the first and second capacitors as an input-side voltage of the inverting circuit, and voltage variable means for varying a reference voltage input, together with the input-side voltage, as a bias to the inverting circuit, a plurality of analog/digital conversion means supplied with outputs from the noise cancelling means and comprised of holding means for holding, as a variation corresponding to the input signal, a measurement value corresponding to a reference voltage when the output of the inverting circuit is inverted during a portion of a time in which the reference voltage of the inverting circuit varies, a plurality of memory means for storing the measurement value of the analog/digital converting means, and scanning means for scanning respective values of the memory means in a time sequential way and for delivering outputs.

13. An image pickup apparatus comprising:

a plurality of photoelectric converting sections having select switches and comprised of a plurality of photoelectric converting elements connected in a parallel array;

a plurality of amplifiers provided in a way to correspond to the photoelectric converting sections and delivering output signals of the photoconverting sections as outputs;

a plurality of noise cancelling means supplied with outputs from the amplifiers and comprising first holding means for allowing a difference voltage between a level at a first time point of an input signal and a reference potential of a given level to be held in a first capacitor connected between the input terminal and the reference potential, second holding means of allowing a difference voltage between a level at a second time point of the input signal and a threshold value of an inverting circuit to be held in a second capacitor connected between the input terminal and input and output terminals of the inverting circuit, means for switching the first and second capacitors to a series-connected state at a third time point to take a combined voltage of the first and second capacitors as an input-side voltage of the inverting circuit, and voltage variable means for varying a reference voltage input, together with the input-side voltage, as a bias to the inverting circuit, and a plurality of analog/digital converting means supplied with outputs from the noise cancelling means and comprising holding means for holding, as a variation of the input signal, a measurement value corresponding to the reference voltage when the output of the corresponding inverting circuit is inverted during a portion of a time in which the reference voltage varies, a plurality of memory for storing the measurement values of the corresponding analog/digital converting means, and scanning means for scanning the respective values of the memory means in a time sequential way and delivering an output.

14. An image pickup device according to claim 12 or 13, wherein the photoelectric converting elements are arranged in a two-dimensional way, the plurality of amplifiers comprise a row-direction amplifier group in each row and column-direction amplifiers in each column, the row-direction amplifier group is selectable for each row and column-direction amplifier group is connected at each output terminal in each group to a common signal line and the respective noise cancelling means is provided on the signal line.

15. An image pickup device according to claim 12 or 13, wherein the photoelectric converting elements are arranged as one column and the noise cancelling means is provided on the respective amplifier.

16. An image pickup device according to claim 12 or 13, wherein the image pickup device is provided as a plurality of units on the common chip.

17. An image pickup device according to claim 12 or 13, wherein color filters of different colors are provided in a predetermined rule array relative to the photoelectric converting elements and the measurement values of respective color signals relative to white color light emerging based on the color filters of different colors are set at a white balance rate.

18. Art image pickup device according to claim 12 or 13, wherein the conversion characteristic of the analog/digital converting means is such as to impart a gamma correction characteristic to the output of the corresponding amplifier.

19. An image pickup device according to claim 12 or 13, wherein the conversion characteristic of the analog/digital converting means is such as to compensate a variation among the corresponding photoelectric converting elements.

20. An image pickup device according to claim 12 or 13, wherein the analog/digital converting means comprises a comparator for comparing an output voltage from the corresponding amplifier with a ramp wave voltage and latch means supplied with a count value of a counter for counting clocks from a starting point of a comparison operation by the comparator and for latching the count value when a coincidence pulse is obtained from the comparator.

* * * * *